United States Patent
Zhu

(10) Patent No.: US 10,178,137 B2
(45) Date of Patent: Jan. 8, 2019

(54) RECORDING METHOD, APPARATUS, AND SYSTEM

(71) Applicant: Huawei Technologies Co., Ltd., Shenzhen (CN)

(72) Inventor: Hongliang Zhu, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 142 days.

(21) Appl. No.: 15/444,503

(22) Filed: Feb. 28, 2017

(65) Prior Publication Data

US 2017/0171257 A1 Jun. 15, 2017

Related U.S. Application Data

(63) Continuation of application No. PCT/CN2015/083221, filed on Jul. 2, 2015.

(30) Foreign Application Priority Data

Aug. 28, 2014 (CN) .......................... 2014 1 0431470

(51) Int. Cl.
*H04L 29/06* (2006.01)
*H04M 3/42* (2006.01)

(52) U.S. Cl.
CPC ...... *H04L 65/1096* (2013.01); *H04L 65/1053* (2013.01); *H04L 65/403* (2013.01); *H04M 3/42* (2013.01)

(58) Field of Classification Search
CPC ............ H04L 65/1096; H04L 65/1053; H04L 65/403; H04M 3/42
See application file for complete search history.

(56) References Cited

U.S. PATENT DOCUMENTS 8,625,577 B1    1/2014  Henderson
8,738,076 B1 *  5/2014  Hitchcock ............... H04M 1/00
                                                        455/555

(Continued)

FOREIGN PATENT DOCUMENTS

CN    101518024 A    8/2009
CN    101605184 A    12/2009

(Continued)

OTHER PUBLICATIONS

Machine Translation and Abstract of Chinese Publication No. CN101605184, Dec. 16, 2009, 19 pages.

(Continued)

*Primary Examiner* — Andrew Lai
*Assistant Examiner* — Sumitra Ganguly
(74) *Attorney, Agent, or Firm* — Conley Rose, P.C.

(57) ABSTRACT

A recording method is presented, including, when an internet protocol private branch exchange (IP PBX) receives a recording instruction sent by any terminal of multiple terminals that are in a same call, sending, by the IP PBX, a first recording indication to a working recording server, which is connected to a mirrored port of a mirror switch, of at least one recording server, acquiring, by the IP PBX, an IP address and a number of a port for transmitting a media stream that are of the working recording server, and sending a terminal identifier to the working recording server; and sending, by the IP PBX, to the working recording server using the IP address and the port number, a media stream that is generated when the multiple terminals that are in the same call have the call, and sending a second recording indication to the working recording server.

13 Claims, 14 Drawing Sheets

(56) References Cited

U.S. PATENT DOCUMENTS

| | | | |
|---|---|---|---|
| 2008/0084984 | A1 | 4/2008 | Levy et al. |
| 2008/0298253 | A1* | 12/2008 | Walker .................. H04L 41/069 370/241 |
| 2009/0110156 | A1* | 4/2009 | Hosteny ............ H04M 3/42221 379/85 |
| 2010/0020943 | A1* | 1/2010 | Hasegawa ......... H04M 3/42221 379/69 |
| 2010/0157991 | A1* | 6/2010 | Kim .................. H04M 3/42221 370/352 |
| 2011/0076990 | A1 | 3/2011 | Silva |
| 2013/0054737 | A1 | 2/2013 | Miranda et al. |

FOREIGN PATENT DOCUMENTS

| | | |
|---|---|---|
| CN | 101616222 A | 12/2009 |
| CN | 102137199 A | 7/2011 |
| CN | 102480575 A | 5/2012 |
| CN | 102595004 A | 7/2012 |
| CN | 102769633 A | 11/2012 |
| CN | 103166913 A | 6/2013 |
| CN | 103248775 A | 8/2013 |
| CN | 103491106 A | 1/2014 |
| EP | 1936915 A1 | 6/2008 |
| WO | 2004077803 A1 | 9/2004 |
| WO | 2006096383 A2 | 9/2006 |

OTHER PUBLICATIONS

Machine Translation and Abstract of Chinese Publication No. CN102480575, May 30, 2012, 16 pages.
Machine Translation and Abstract of Chinese Publication No. CN103248775, Aug. 14, 2013, 7 pages.
Foreign Communication From a Counterpart Application, European Application No. 15835499.3, Extended European Search Report dated Jul. 17, 2017, 10 pages.
Machine Translation and Abstract of Chinese Publication No. CN101616222, Dec. 30, 2009, 29 pages.
Machine Translation and Abstract of Chinese Publication No. CN102137199, Jul. 27, 2011, 11 pages.
Machine Translation and Abstract of Chinese Publication No. CN102769633, Nov. 7, 2012, 14 pages.
Machine Translation and Abstract of Chinese Publication No. CN103166913, Jun. 19, 2013, 11 pages.
Machine Translation and Abstract of Chinese Publication No. CN103491106, Jan. 1, 2014, 15 pages.
"Series H: Audiovisual and Multimedia Systems, Infrastructure of audiovisual services—Systems and terminal equipment for audiovisual services, Packet-based multimedia communications systems, Amendment 1: Use of Facility message to enable call transfer," ITU-T, H.323, Amendment 1, Mar. 2013, 8 pages.
Foreign Communication From a Counterpart Application, PCT Application No. PCT/CN2015/083221, English Translation of International Search Report dated Aug. 26, 2015, 3 pages.
Foreign Communication From a Counterpart Application, PCT Application No. PCT/CN2015/083221, English Translation of Written Opinion dated Aug. 26, 2015, 5 pages.

* cited by examiner

RECORDING METHOD, APPARATUS, AND SYSTEM

CROSS-REFERENCE TO RELATED APPLICATIONS

This application is a continuation of International Application No. PCT/CN2015/083221, filed on Jul. 2, 2015, which claims priority to Chinese Patent Application No. 201410431470.3, filed on Aug. 28, 2014, both of which are hereby incorporated by reference in their entireties.

TECHNICAL FIELD

The present disclosure relates to the field of voice communications technologies, and in particular, to a recording method, apparatus, and system.

BACKGROUND

In daily life or work, during a point-to-point call or a conference call, when a user sometimes needs to save an important call, the user generally performs on-demand recording on an ongoing call. Generally, during a call, the user may directly press a key on an IP phone set to start recording, so that a call recording of a particular period of time can be saved.

In the prior art, using a point-to-point call as an example, a user presses a key on an internet protocol (IP) phone set during a call to start recording, and the IP phone set sends a recording request to an IP Private Branch exchange (IP PBX), that is, an IP network-based voice switch. The IP PBX creates a voice site, connects a calling party and a called party to the voice site, and sends a Session Initiation Protocol (SIP) Invite message to a SIP Server. The SIP Server selects a proper recording server from a recording server group, adds an IP address and a port number that are of the recording server to a 200 OK message, and replies to the IP PBX with the message. The IP PBX adds the recording server to the voice site, and sends a media stream of the calling party and the called party that is obtained by means of audio mixing to the recording server using the IP address and the port number that are of the recording server. The recording server acquires the media stream, thereby implementing recording.

Typically, a process from when an IP PBX creates a call to when a recording server is connected to the call involves a process of interworking and processing of multiple pieces of SIP signaling. In such period of time, the recording server cannot acquire a media stream of a user call on which audio mixing is performed. As a result, recording cannot be implemented, and the call of this period of time is lost.

SUMMARY

Embodiments of the present disclosure provide a recording method, which can resolve a prior-art problem of incomplete recording because a call cannot be recorded in real time after a recording instruction of a terminal is received.

A first aspect of the present disclosure provides a recording method, where the method is applied to a voice call system, the voice call system includes an IP private branch exchange IP PBX, a mirror switch, and at least one recording server, the IP PBX is connected to the mirror switch, and the method includes, when the IP PBX receives a recording instruction sent by any terminal of multiple terminals that are in a same call, sending, by the IP PBX, a first recording indication to a working recording server, which is connected to a mirrored port of the mirror switch, of the at least one recording server, where the first recording indication includes a terminal identifier of the any terminal of the multiple terminals, and the first recording indication is used to instruct the working recording server to acquire, from the mirror switch according to the terminal identifier using the mirrored port, a media stream that is generated when the multiple terminals have the call, and store, corresponding to the terminal identifier, the media stream that is generated when the multiple terminals have the call; acquiring, by the IP PBX, an IP address and a number of a port for transmitting the media stream that are of the working recording server; and sending, by the IP PBX, to the working recording server using the IP address and the port number, the media stream that is generated when the multiple terminals that are in the same call have the call, and sending the terminal identifier and a second recording indication to the working recording server, to instruct the working recording server to stop acquiring, from the mirror switch, the media stream that is generated when the multiple terminals that are in the same call have the call, and start to store, corresponding to the terminal identifier, the media stream that is generated when the multiple terminals have the call and that is received from the IP PBX.

With reference to the first aspect of the embodiments of the present disclosure, in a first implementation manner of the first aspect of the embodiments of the present disclosure, the sending, by the IP PBX, a first recording indication to a working recording server includes sending, by the IP PBX, the first recording indication to the working recording server, so that the working recording server performs, using the mirrored port, which is connected to the working recording server, of the mirror switch, mirrored packet capture on a data packet corresponding to an IP address of the terminal, to acquire the media stream that is generated when the multiple terminals that are in the same call have the call, and stores, corresponding to the IP address of the terminal, the media stream that is generated when the multiple terminals that are in the same call have the call.

With reference to the first aspect of the embodiments of the present disclosure or the first implementation manner of the first aspect, in a second implementation manner of the first aspect of the embodiments of the present disclosure, the voice call system includes multiple recording servers and a recording server management device, and the sending, by the IP PBX, a first recording indication to a working recording server includes sending, by the IP PBX, the first recording indication to the recording server management device, so that the recording server management device selects, from at least two recording servers according to the first recording indication, the working recording server connected to the mirrored port of the mirror switch, and forwards the first recording indication to the working recording server; the acquiring, by the IP PBX, an IP address and a number of a port for transmitting the media stream that are of the working recording server, and sending the terminal identifier to the working recording server includes sending, by the IP PBX, an invite message to the recording server management device, and receiving an invite response that includes the IP address of the working recording server and the port number and that is returned by the recording server management device; the sending the terminal identifier to the working recording server includes adding the terminal identifier to the invite message, and sending the invite message to the recording server management device, so that the recording server management device determines the working recording server according to the terminal identifier, and sends the terminal identifier to the working recording server; and further, the sending the second recording indication to the working recording server includes sending the second recording indication to the working recording server using the recording server management device.

With reference to the first aspect of the embodiments of the present disclosure, or either of the first and second implementation manners of the first aspect of the embodiments of the present disclosure, after the IP PBX receives the recording instruction sent by the any terminal, the method further includes, when the IP PBX determines that a medium used by all the terminals that are in the same call to have the call is an encrypted medium, controlling, by the IP PBX, all the terminals that are in the same call to change the medium used in the call into an unencrypted medium by means of negotiation; before the sending, by the IP PBX, to the working recording server using the IP address and the port number, the media stream that is generated when the multiple terminals that are in the same call have the call, the method further includes controlling, by the IP PBX, the multiple terminals that are in the same call to change the medium used in the call into an encrypted medium by means of renegotiation; and further, the sending, to the working recording server using the IP address and the port number, the media stream that is generated when the multiple terminals that are in the same call have the call includes separately decrypting received media streams that are sent by the multiple terminals that are in the same call, to obtain decrypted media streams, performing audio mixing on the decrypted media streams, and sending the decrypted media streams on which audio mixing is performed to the working recording server using the IP address and the port number.

With reference to the first aspect of the embodiments of the present disclosure, or any one of the first to third implementation manners of the first aspect of the embodiments of the present disclosure, after the acquiring, by the IP PBX, an IP address and a number of a port for transmitting the media stream that are of the working recording server, the method further includes connecting, by the IP PBX, according to the IP address and the port number that are of the working recording server, the working recording server to a voice site that includes the multiple terminals that are in the same call.

With reference to the first aspect of the embodiments of the present disclosure and the fourth implementation manner of the first aspect, in a fifth implementation manner of the first aspect of the embodiments of the present disclosure, when there are two terminals in the same call, the method further includes, after the IP PBX receives the recording instruction, creating, by the IP PBX according to the terminal identifier, a voice site that includes the terminals that are in the same call.

A second aspect of the present disclosure provides a recording method, where the method includes receiving, by a recording server management device, a first recording indication that is sent by an IP PBX when the IP PBX receives a recording instruction sent by any terminal of multiple terminals that are in a same call, where the first recording indication includes a terminal identifier of the any terminal of the multiple terminals; selecting, by the recording server management device, from at least two recording servers according to the first recording indication, a working recording server connected to a mirrored port of a mirror switch; forwarding the first recording indication to the working recording server, to instruct the working recording server to acquire, from the mirror switch according to the terminal identifier of the any terminal using the mirrored port, a media stream that is generated when the multiple terminals that are in the same call have the call, and store, corresponding to the terminal identifier, the media stream that is generated when the multiple terminals that are in the same call have the call; receiving, by the recording server management device, an invite message sent by the IP PBX, where the invite message includes the terminal identifier; determining, by the recording server management device, the working recording server according to the terminal identifier, and forwarding the terminal identifier to the working recording server; returning, to the IP PBX, an invite response that includes an IP address of the working recording server, so that the IP PBX sends, to the working recording server using the IP address and a port number, the media stream that is generated when the multiple terminals that are in the same call have the call; and when receiving a second recording indication sent by the IP PBX, forwarding, by the recording server management device, the second recording indication to the working recording server, to instruct the working recording server to stop acquiring, from the mirror switch, the media stream that is generated when the multiple terminals that are in the same call have the call, start to receive a media stream that is generated when the multiple terminals that are in the same call have the call and that is sent by the IP PBX, and store, corresponding to the terminal identifier, the media stream that is generated when the multiple terminals that are in the same call have the call.

A third aspect of the present disclosure provides a recording method, where the method includes receiving, by a recording server, a first recording indication sent by an IP PBX, acquiring, from a mirror switch connected to the IP PBX, according to a terminal identifier that is of any terminal of multiple terminals that are in a same call and that is carried in the first recording indication, a media stream that is generated when the multiple terminals that are in the same call have the call, and storing, corresponding to the terminal identifier, the media stream that is generated when the multiple terminals that are in the same call have the call; receiving, by the recording server, the media stream that is generated when the multiple terminals that are in the same call have the call and that is sent by the IP PBX after the IP PBX acquires an IP address and a number of a port for transmitting the media stream that are of the recording server, where the IP PBX sends the media stream using the IP address and the port number; and receiving, by the recording server, the terminal identifier and a second recording indication that are sent by the IP PBX, and according to the second recording indication, stopping acquiring, from the mirror switch, the media stream that is generated when the multiple terminals that are in the same call have the call, and starting to store, corresponding to the terminal identifier, a media stream that is generated when the multiple terminals that are in the same call have the call and that is received from the IP PBX.

With reference to the third aspect of the embodiments of the present disclosure, in a first implementation manner of the third aspect of the embodiments of the present disclosure, the terminal identifier includes an IP address of the terminal, and the acquiring, from a mirror switch connected to the IP PBX, a media stream that is generated when the multiple terminals that are in the same call have the call includes performing, using a mirrored port, which is connected to the IP PBX, of the mirror switch, mirrored packet capture on a data packet corresponding to the IP address of the terminal, to acquire the media stream that is generated when the multiple terminals that are in the same call have the call.

A fourth aspect of the present disclosure provides an IP private branch exchange IP PBX, where the IP private branch exchange includes a first sending unit configured to, when a recording instruction sent by any terminal of multiple terminals that are in a same call is received, send a first recording indication to a working recording server, which is connected to a mirrored port of a mirror switch, of at least one recording server, where the first recording indication includes a terminal identifier of the any terminal of the multiple terminals, and the first recording indication is used to instruct the working recording server to acquire, from the mirror switch according to the terminal identifier using the mirrored port, a media stream that is generated when the multiple terminals that are in the same call have the call, and store, corresponding to the terminal identifier, the media stream that is generated when the multiple terminals that are in the same call have the call; a first acquiring unit configured to acquire an IP address and a number of a port for transmitting the media stream that are of the working recording server; a second sending unit configured to send the terminal identifier to the working recording server; a third sending unit configured to send, to the working recording server using the IP address and the port number, the media stream that is generated when the multiple terminals that are in the same call have the call, and send a second recording indication to the working recording server, to instruct the working recording server to stop acquiring, from the mirror switch, the media stream that is generated when the multiple terminals that are in the same call have the call; and a fourth sending unit configured to send, to the working recording server, the media stream that is generated when the multiple terminals that are in the same call have the call, so that the working recording server stores, corresponding to the terminal identifier, the media stream that is generated when the multiple terminals that are in the same call have the call.

With reference to the fourth aspect of the embodiments of the present disclosure, in a first implementation manner of the fourth aspect of the embodiments of the present disclosure, the terminal identifier includes an IP address of the terminal, and the first sending unit includes a first sending module configured to send the first recording indication to the working recording server, so that the working recording server performs, using the mirrored port, which is connected to the working recording server, of the mirror switch, mirrored packet capture on a data packet corresponding to the IP address of the terminal, to acquire the media stream that is generated when the multiple terminals that are in the same call have the call.

With reference to the fourth aspect of the embodiments of the present disclosure or the first implementation manner of the fourth aspect of the embodiments of the present disclosure, in a second implementation manner of the fourth aspect of the embodiments of the present disclosure, the fourth sending unit includes a second sending module configured to send the first recording indication to a recording server management device, so that the recording server management device selects, from at least two recording servers according to the first recording indication, the working recording server connected to the mirrored port of the mirror switch, and forwards the first recording indication to the working recording server; further, the second sending unit includes a third sending module configured to add the terminal identifier to an invite message, and send the invite message to the recording server management device, so that the recording server management device determines the working recording server according to the terminal identifier, and sends the terminal identifier to the working recording server; further, the first acquiring unit includes a first acquiring module configured to acquire an invite response that includes the IP address and the port number and that is returned by the recording server management device; and a second acquiring module configured to acquire the IP address and the port number from the invite response; and further, the third sending unit includes a fourth sending module configured to send the second recording indication to the working recording server using the recording server management device.

With reference to the fourth aspect of the embodiments of the present disclosure, in a third implementation manner of the fourth aspect of the embodiments of the present disclosure, the IP PBX further includes a first control unit configured to, when it is determined that a medium used by the terminals in the same call to have the call is an encrypted medium, control the terminals in the same call to change the medium used in the call into an unencrypted medium by means of negotiation; a second control unit configured to control the terminals in the same call to change the medium used in the call into an encrypted medium by means of renegotiation; and further, the fourth sending unit includes a first execution module configured to separately decrypt received media streams that are sent by the multiple terminals that are in the same call, to obtain decrypted media streams; and the second sending module configured to perform audio mixing on the decrypted media streams, and send the decrypted media streams on which audio mixing is performed to the working recording server using the IP address and the port number.

With reference to the fourth aspect of the embodiments of the present disclosure, in a fourth implementation manner of the fourth aspect of the embodiments of the present disclosure, the IP PBX further includes a third control unit configured to connect, according to the IP address of the working recording server, the working recording server to a voice site that includes the multiple terminals that are in the same call.

With reference to the fourth aspect of the embodiments of the present disclosure, in a fifth implementation manner of the fourth aspect of the embodiments of the present disclosure, the IP PBX further includes a second execution unit configured to, after the recording instruction is received, create, according to the terminal identifier, the voice site that includes the terminals that are in the same call.

A fifth aspect of the present disclosure provides a recording server management device, where the recording server management device includes a first receiving unit configured to receive a first recording indication that is sent by an IP PBX when the IP PBX receives a recording instruction sent by any terminal of multiple terminals that are in a same call, where the first recording indication includes a terminal identifier of the any terminal of the multiple terminals; a first execution unit configured to select, from at least two recording servers according to the first recording indication, a working recording server connected to a mirrored port of a mirror switch; a first sending unit configured to forward the first recording indication to the working recording server, to instruct the working recording server to acquire, from the mirror switch according to the terminal identifier of the any terminal, a media stream that is generated when the multiple terminals that are in the same call have the call, and store, corresponding to the terminal identifier, the media stream that is generated when the multiple terminals that are in the same call have the call; a second receiving unit configured to receive an invite message sent by the IP PBX, where the invite message includes the terminal identifier; a second sending unit configured to determine the working recording server according to the terminal identifier, and forward the terminal identifier to the working recording server; a third sending unit configured to return, to the IP PBX, an invite response that includes an IP address of the working recording server, so that the IP PBX sends, to the working recording server using the IP address and a port number, the media stream that is generated when the multiple terminals that are in the same call have the call; and a fourth sending unit configured to, when a second recording indication sent by the IP PBX is received, forward the second recording indication to the working recording server, to instruct the working recording server to stop acquiring, from the mirror switch, the media stream that is generated when the multiple terminals that are in the same call have the call, start to receive a media stream that is generated when the multiple terminals that are in the same call have the call and that is sent by the IP PBX, and store, corresponding to the terminal identifier, the media stream that is generated when the multiple terminals that are in the same call have the call.

A sixth aspect of the present disclosure provides a recording server, where the recording server includes a first receiving unit configured to receive a first recording indication sent by an IP PBX; a first execution unit configured to acquire, from a mirror switch connected to the IP PBX, according to a terminal identifier that is of any terminal of multiple terminals that are in a same call and that is carried in the first recording indication, a media stream that is generated when the multiple terminals that are in the same call have the call, and store, corresponding to the terminal identifier, the media stream that is generated when the multiple terminals that are in the same call have the call; a second receiving unit configured to receive the media stream that is generated when the multiple terminals that are in the same call have the call and that is sent by the IP PBX after the IP PBX acquires an IP address and a number of a port for transmitting the media stream that are of the recording server, where the IP PBX sends the media stream using the IP address and the port number; a third receiving unit configured to receive the terminal identifier and a second recording indication that are sent by the IP PBX, where the second recording indication is used to instruct the first execution unit to stop acquiring, according to the terminal identifier, the media stream that is generated when the multiple terminals have the call; and a second execution unit configured to, according to the second recording indication received by the third receiving unit, stop acquiring, from the mirror switch, the media stream that is generated when the multiple terminals have the call, and start to store, corresponding to the terminal identifier, a media stream that is generated when the multiple terminals that are in the same call have the call and that is received from the IP PBX.

With reference to the sixth aspect of the embodiments of the present disclosure, in a first implementation manner of the sixth aspect of the embodiments of the present disclosure, the terminal identifier includes an IP address of the terminal and the port number, and the first execution unit includes a first execution module configured to perform, using a mirrored port, which is connected to the IP PBX, of the mirror switch, mirrored packet capture on a data packet corresponding to the IP address of the terminal, to acquire the media stream that is generated when the multiple terminals that are in the same call have the call.

A seventh aspect of the present disclosure provides a recording system, where the system includes the IP private branch exchange according to the fourth aspect of the present disclosure or any implementation manner of the first implementation manner to the fifth implementation manner of the fourth aspect of the embodiments of the present disclosure; and the recording server according to either of the sixth aspect of the present disclosure and the first implementation manner of the sixth aspect of the embodiments of the present disclosure; further, the system includes the recording server management device according to the fifth aspect of the present disclosure; and further, the system includes a mirror switch connected to the recording server according to the first aspect of the present disclosure.

In the embodiments of the present disclosure, when receiving a recording instruction sent by a terminal, an IP PBX sends a first recording indication to a working recording server, which is connected to a mirrored port of a mirror switch, of at least one recording server, so that after receiving the first recording indication, the working recording server acquires a call media stream of the multiple terminals from the mirror switch according to a terminal identifier, thereby implementing recording of a call before a second recording indication is sent. After acquiring an IP address and a port number that are of the working recording server, the IP PBX sends the second recording indication to the working recording server, so that the working recording server switches to a recording manner in which a call media stream is acquired directly from the IP PBX. Combination of the two recording manners resolves a prior-art problem of incomplete recording caused by a delay because a call cannot be recorded immediately after an IP PBX receives a recording instruction.

DESCRIPTION OF EMBODIMENTS

Figure 1:
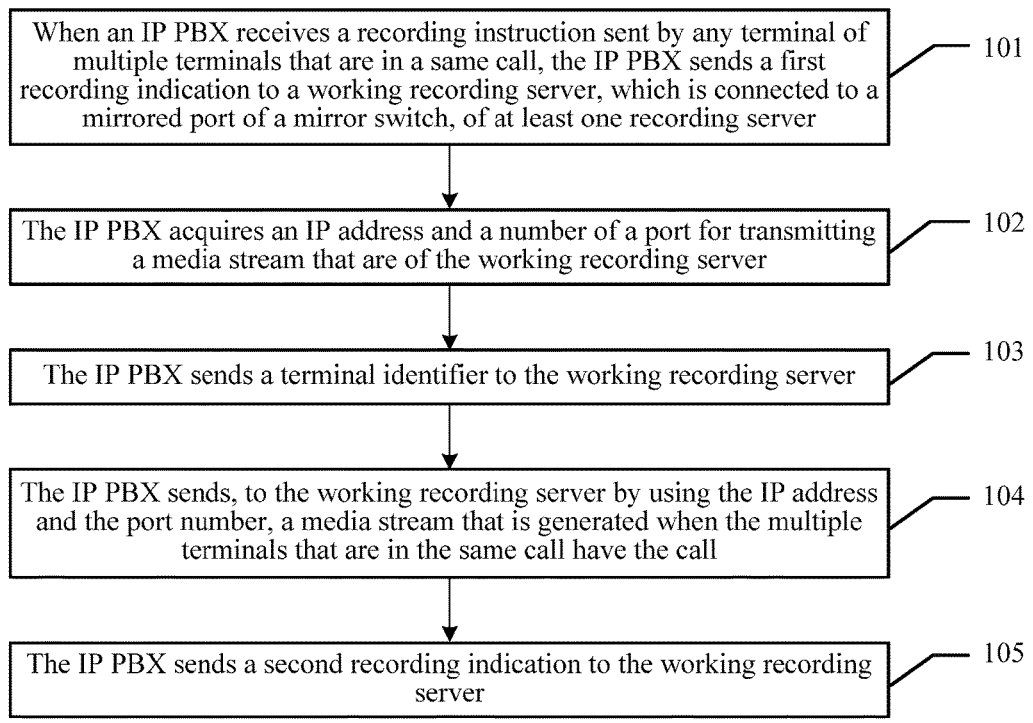
FIG. 1 is a schematic diagram of an embodiment of a recording method according to this embodiment.

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person skilled in the art based on the embodiments of the present disclosure without creative efforts shall fall within the protection scope of the present disclosure.

It should be noted that the terms used in the embodiments of the present disclosure are merely used for illustrating specific embodiments, and are not intended to limit the present disclosure. The terms "a", "the said" and "the" of singular forms used in the embodiments and the appended claims of the present disclosure are also intended to include plural forms, unless otherwise specified in the context clearly. It should be further understood that "multiple" described in this specification means "at least two" and includes "two". The term "and/or" used in this specification means including any or all possible combinations of one or more related listed items.

It should be understood that, although terms such as first and second may be used in the embodiments of the present disclosure to describe users or terminals, the users or the terminals shall not be limited to these terms. These terms are used only to distinguish the users or the terminals. For example, without departing from the scope of the embodiments of the present disclosure, a first user may also be referred to as a second user, and similarly, a second user may also be referred to as a first user; likewise, a second user may also be referred to as a third user, and so on, which is not limited in the embodiments of the present disclosure.

Depending on the context, for example, a word "if" used herein may be construed as "when" or "while" or "in response to determining" or "in response to detecting". Similarly, depending on the context, a term "if it is determined that" or "if it is detected that (a stated condition or event)" may be construed as "when it is determined that" or "in response to determining" or "when it is detected that (a stated condition or event)" or "in response to detecting (a stated condition or event)".

In the embodiments of the present disclosure, a recording method disclosed in the embodiments is applicable to a call that is created using a Session Initiation Protocol, and is also applicable to a call that is created using an H.323 protocol and another call similar thereto, which are not limited in the embodiments. The method is applied to a voice call system, where the voice call system includes an IP private branch exchange IP PBX, a mirror switch, a recording server management device, and a recording server. It should be noted that when there are two terminals that are in a same call, the IP PBX may first create, especially for the two terminals, an additional voice site that includes the two terminals, and then connect the recording server to the voice site. When the call is a conference call that includes at least three terminals, no voice site needs to be additionally created. Moreover, the mirror switch described in the embodiments of the present disclosure refers to a switch that has a mirrored port, and is not limited to a local area network switch or a non-local area network switch, as long as the switch has a mirror function, which is not limited in this specification.

A specific process for recording a call in the embodiments of the present disclosure is a voice site performs audio mixing on media of a calling party and a called party, to form a media stream, and a recording server acquires and stores the media stream, so that recording of a call is finished.

Referring to FIG. 1, an embodiment of a recording method in the embodiments of the present disclosure includes the following steps.

Step 101. When an IP PBX receives a recording instruction sent by any terminal of multiple terminals that are in a same call, the IP PBX sends a first recording indication to a working recording server, which is connected to a mirrored port of a mirror switch, of at least one recording server.

The first recording indication includes a terminal identifier of the any terminal of the multiple terminals, and the terminal identifier may be a terminal identifier of the terminal that sends the recording instruction, or may be a terminal identifier of another terminal of the multiple terminals. The first recording indication is used to instruct the working recording server to acquire, from the mirror switch according to the terminal identifier using the mirrored port, a media stream that is generated when the multiple terminals have the call, and store, corresponding to the terminal identifier, the media stream that is generated when the multiple terminals have the call.

Step 102. The IP PBX acquires an IP address and a number of a port for transmitting a media stream that are of the working recording server.

Step 103. The IP PBX sends a terminal identifier to the working recording server.

Step 104. The IP PBX sends, to the working recording server using the IP address and the port number, a media stream that is generated when the multiple terminals that are in the same call have the call.

Step 105. The IP PBX sends a second recording indication to the working recording server.

The second recording indication is used to instruct the working recording server to stop acquiring, from the mirror switch, the media stream that is generated when the multiple terminals that are in the same call have the call, and start to store, corresponding to the terminal identifier received in step 103, the media stream that is generated when the multiple terminals have the call and that is received from the IP PBX.

The terminal identifier may further include a phone number of the terminal. The first recording indication may further include a phone number of another terminal in the call. Correspondingly, after finishing recording of a medium used in the call, the working recording server may store, corresponding to the phone number of the terminal in the call, a recorded complete medium, to help subsequently retrieve a corresponding call medium according to the phone number.

In this embodiment of the present disclosure, when receiving a recording instruction sent by a terminal, an IP PBX sends a first recording indication to a working recording server connected to a mirrored port of a mirror switch, so that after receiving the first recording indication, the working recording server acquires a call media stream from the mirror switch according to a terminal identifier, thereby implementing recording of a call before a second recording indication is sent. The IP PBX sends the second recording indication to the working recording server, so that the working recording server switches to a recording manner in which a call media stream is acquired directly from the IP PBX. Combination of the two recording manners resolves a prior-art problem of incomplete recording caused by a delay because a call cannot be recorded immediately after an IP PBX receives a recording instruction.

Figure 2:
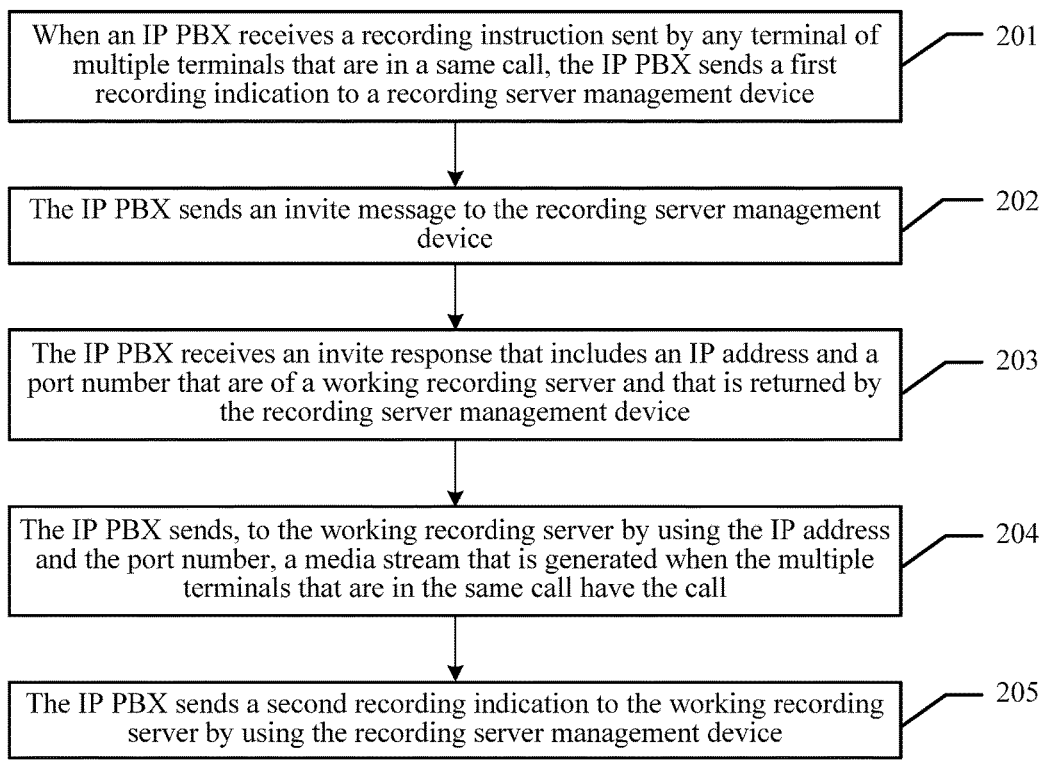
FIG. 2 is a schematic diagram of another embodiment of a recording method according to this embodiment.

Referring to FIG. 2, the following describes the embodiments of the present disclosure using a recording server management device as an example. Another embodiment of a recording method in the embodiments of the present disclosure includes the following steps.

Step 201. When an IP PBX receives a recording instruction sent by any terminal of multiple terminals that are in a same call, the IP PBX sends a first recording indication to a recording server management device.

The IP PBX sends the first recording indication to the recording server management device, so that the recording server management device selects, from at least two recording servers according to the first recording indication, a working recording server connected to a mirrored port of a mirror switch, and forwards the first recording indication to the working recording server.

The first recording indication includes a terminal identifier of any terminal, where the terminal identifier of the any terminal may be a terminal identifier of the terminal that sends the recording instruction, or may be a terminal identifier of another terminal of the multiple terminals.

The terminal identifier may include an IP address of the terminal. Correspondingly, in step 201, the first recording indication is used to instruct the working recording server to perform, using the mirrored port, which is connected to the working recording server, of the mirror switch, mirrored packet capture on a data packet corresponding to the IP address of the terminal, to acquire a media stream that is generated when the multiple terminals that are in the same call have the call, and store, corresponding to the IP address of the terminal, the media stream that is generated when the multiple terminals that are in the same call have the call.

The terminal identifier may further include a port number of the terminal. Correspondingly, in step 201, the first recording indication is used to instruct the working recording server to perform, using the mirrored port, which is connected to the working recording server, of the mirror switch, mirrored packet capture on the data packet corresponding to the port number of the terminal, to acquire the media stream that is generated when the multiple terminals that are in the same call have the call, and store, corresponding to the port number of the terminal, the media stream that is generated when the multiple terminals that are in the same call have the call. Multiple phone numbers may be configured for the terminal that corresponds to the terminal identifier, and the terminal may have calls using multiple phone numbers at the same time. When multiple phone numbers are used to have calls, a call corresponding to one phone number is in a connected state, and a call corresponding to another phone number is in an on-hold state. IP addresses used by the multiple phone numbers to create the calls are the same, but port numbers are different. To be compatible with such a scenario, the terminal identifier may further include a port number, to help a recording server distinguish media used in different calls when the recording server records a medium file.

Step 202. The IP PBX sends an invite message to the recording server management device.

The IP PBX sends the invite message to the recording server management device, where the invite message carries the terminal identifier, so that the recording server management device extracts the terminal identifier from the invite message, and sends the terminal identifier to the working recording server.

The invite message may be used to instruct the recording server management device to control the working recording server to connect to a voice site that includes the multiple terminals that are in the same call.

Step 203. The IP PBX receives an invite response that includes an IP address and a port number that are of a working recording server and that is returned by the recording server management device.

After receiving the invite response, the IP PBX extracts the IP address and the port number that are of the working recording server from the invite response, and connects the working recording server to the voice site according to the IP address and the port number that are of the working recording server.

Step 204. The IP PBX sends, to the working recording server using the IP address and the port number, a media stream that is generated when the multiple terminals that are in the same call have the call.

Step 205. The IP PBX sends a second recording indication to the working recording server using the recording server management device.

The second recording indication is used to instruct the working recording server to stop acquiring, from the mirror switch, the media stream that is generated when the multiple terminals that are in the same call have the call, and start to store, corresponding to the terminal identifier (for example, the IP address of the terminal), the media stream that is generated when the multiple terminals have the call and that is received from the IP PBX.

A specific implementation may also be that the terminal identifier includes the IP address of the terminal and a terminal number (that is, a phone number used by the terminal in the call). Correspondingly, in step 201, the first recording indication may be used to instruct the working recording server to perform, using the mirrored port, which is connected to the working recording server, of the mirror switch, mirrored packet capture on a data packet corresponding to the port number of the terminal, to acquire the media stream that is generated when the multiple terminals that are in the same call have the call, and store, corresponding to the terminal number, the media stream that is generated when the multiple terminals that are in the same call have the call. In step 202, the media stream that is generated when the multiple terminals have the call and that is received from the IP PBX is stored corresponding to the terminal number.

In this embodiment of the present disclosure, an IP PBX sends a first recording indication to a working recording server connected to a mirrored port of a mirror switch, so that after receiving the first recording indication, the working recording server acquires a call media stream according to an IP address of a terminal, thereby implementing recording of a call before a second recording indication is sent. The IP PBX sends the second recording indication to a recording server management device, so that the working recording server switches to a recording manner in which a call media stream is acquired directly from the IP PBX. Combination of the two recording manners ensures completeness of call recording in a process of on-demand recording by a user.

Figure 3:
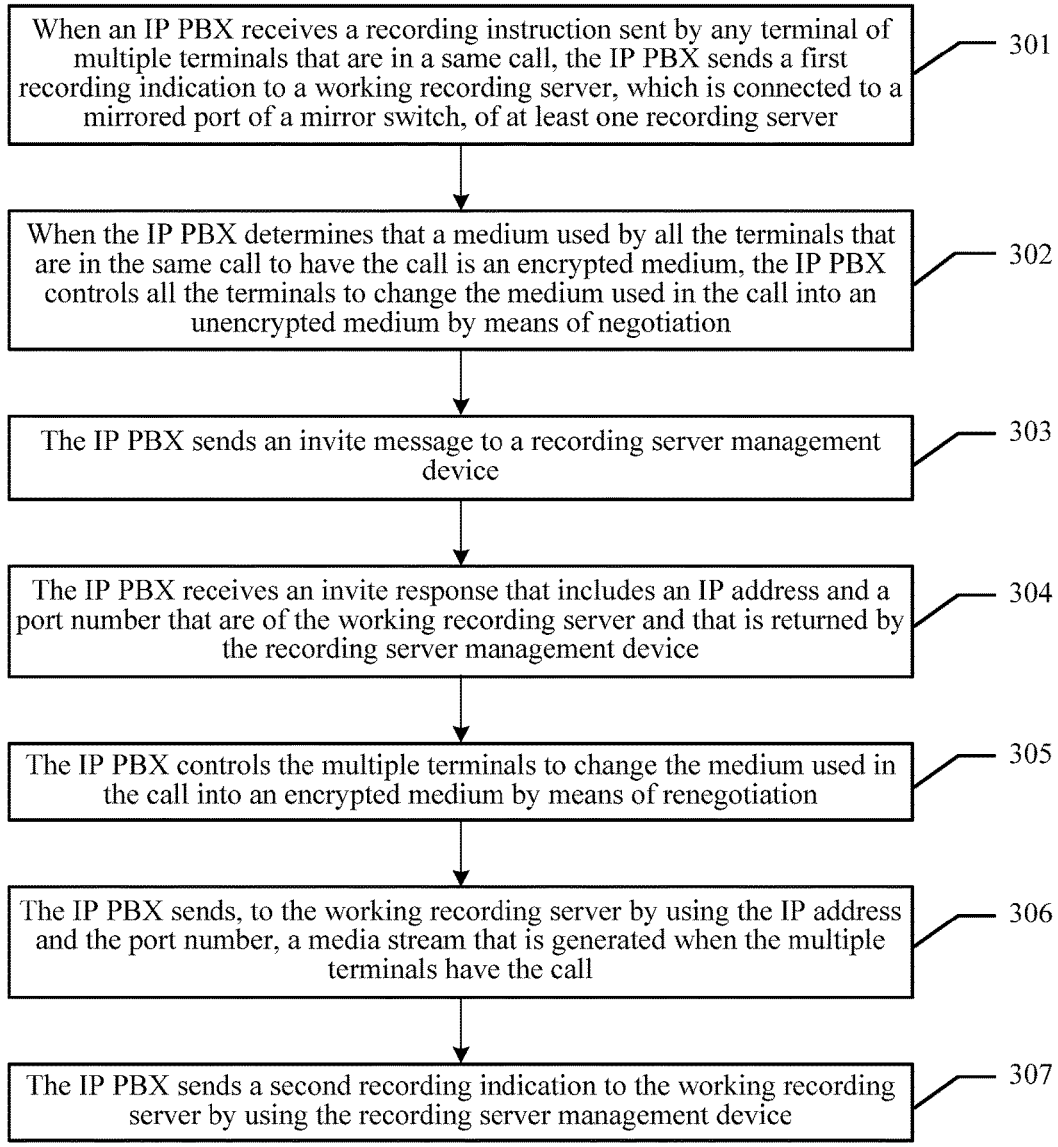
FIG. 3 is a schematic diagram of another embodiment of a recording method according to this embodiment.

Referring to FIG. 3, another embodiment of a recording method in the embodiments of the present disclosure includes the following steps.

Step 301. When an IP PBX receives a recording instruction sent by any terminal of multiple terminals that are in a same call, the IP PBX sends a first recording indication to a working recording server, which is connected to a mirrored port of a mirror switch, of at least one recording server.

The IP PBX sends the first recording indication to the working recording server, where the first recording indication includes a terminal identifier of the any terminal, and the terminal identifier may be an IP address of the terminal, so that the working recording server performs, using the mirrored port, which is connected to the working recording server, of the mirror switch, mirrored packet capture on a data packet corresponding to the IP address of the terminal, to acquire a media stream that is generated when the multiple terminals that are in the same call have the call, and stores, corresponding to the IP address of the terminal, the media stream that is generated when the multiple terminals have the call.

Step 302. When the IP PBX determines that a medium used by all the terminals that are in the same call to have the call is an encrypted medium, the IP PBX controls all the terminals to change the medium used in the call into an unencrypted medium by means of negotiation.

Step 303. The IP PBX sends an invite message to a recording server management device.

The IP PBX sends the invite message to the recording server management device, where the invite message carries the terminal identifier of the any terminal of the multiple terminals, so that the recording server management device extracts the terminal identifier from the invite message, and sends the terminal identifier to the working recording server.

The invite message is used to instruct the recording server management device to control the working recording server to connect to a voice site.

Step 304. The IP PBX receives an invite response that includes an IP address and a port number that are of the working recording server and that is returned by the recording server management device.

After receiving the invite response, the IP PBX extracts the IP address and the port number that are of the working recording server from the invite response, and may further connect the working recording server to the voice site according to the IP address and the port number that are of the working recording server.

Step 305. The IP PBX controls the multiple terminals to change the medium used in the call into an encrypted medium by means of renegotiation.

Step 306. The IP PBX sends, to the working recording server using the IP address and the port number, a media stream that is generated when the multiple terminals that are in the same call have the call.

Received media streams that are sent by the multiple terminals that are in the same call are separately decrypted, to obtain decrypted media streams, audio mixing is performed on the decrypted media streams, and the decrypted media streams on which audio mixing is performed are sent to the working recording server using the IP address and the port number that are of the working recording server.

Before sending the media streams on which audio mixing is performed to the working recording server, the IP PBX may further encrypt, using a key obtained by means of negotiation between the IP PBX and the working recording server, the media streams on which audio mixing is performed, and then send the encrypted media stream on which audio mixing is performed to the working recording server.

Step 307. The IP PBX sends a second recording indication to the working recording server using the recording server management device.

The second recording indication is used to instruct the working recording server to stop acquiring, from the mirror switch, the media stream that is generated when the multiple terminals that are in the same call have the call, and start to store, corresponding to the IP address of the terminal, the received media stream that is generated when the multiple terminals have the call and that is sent by the IP PBX.

It should be noted that the terminal identifier exacted from the invite message by the recording server management device and the second recording indication forwarded to the working recording server may be added to a same message and sent to the working recording server.

In this embodiment of the present disclosure, an IP PBX sends a first recording indication to a working recording server connected to a mirrored port of a mirror switch, and when it is determined that a medium used by all terminals that are in a same call to have the call is an encrypted medium, the IP PBX controls all the terminals that are in the same call to change the medium used in the call into an unencrypted medium by means of negotiation, so that the working recording server acquires an unencrypted media stream according to an IP address of a terminal, thereby implementing recording of the call before a second recording indication is sent. The IP PBX sends the second recording indication to a recording server management device, and changes the medium used in the call into an encrypted medium by means of renegotiation, so that the working recording server switches to a recording manner in which a call media stream is acquired directly from the IP PBX. Combination of the two recording manners ensures completeness of call recording in a process of on-demand recording by a user.

Figure 4:
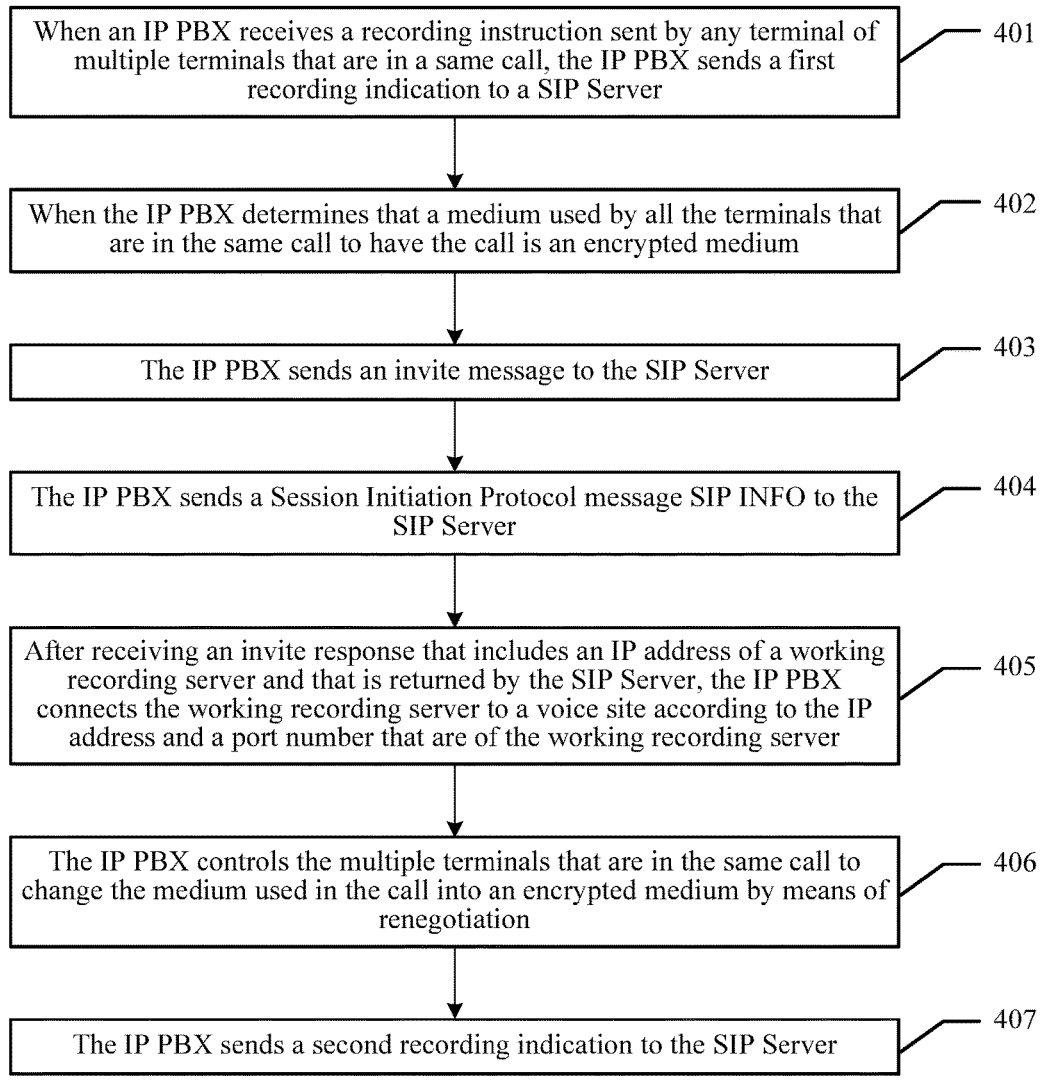
FIG. 4 is a schematic diagram of another embodiment of a recording method according to this embodiment.

Referring to FIG. 4, the following describes the present disclosure in detail using a SIP Server as an example. Another embodiment of a recording method in the embodiments of the present disclosure includes the followings steps.

Step 401. When an IP PBX receives a recording instruction sent by any terminal of multiple terminals that are in a same call, the IP PBX sends a first recording indication to a SIP Server.

The IP PBX sends the first recording indication to the SIP Server, so that the SIP Server selects, from at least one recording server, a recording server connected to a mirrored port of a local area network switch, as a working recording server for recording, and that the SIP Server controls the working recording server to perform, according to an IP address of the terminal using the mirrored port connected to the working recording server, mirrored packet capture on a data packet corresponding to the IP address of the terminal, to acquire a media stream that is generated when the multiple terminals that are in the same call have the call, and store, corresponding to the IP address of the terminal, the media stream that is generated when the multiple terminals that are in the same call have the call.

Step 402. When the IP PBX determines that a medium used by all the terminals that are in the same call to have the call is an encrypted medium, the IP PBX controls the multiple terminals that are in the same call to change the medium used in the call into an unencrypted medium by means of negotiation.

When the IP PBX determines that the medium used by all the terminals that are in the same call to have the call is an encrypted medium, the IP PBX controls the multiple terminals that are in the same call to change the medium used in the call into an unencrypted medium by means of negotiation, so that the media stream that is generated when all the terminals have the call is an unencrypted media stream, and the working recording server acquires the unencrypted media stream according to the IP address of the terminal.

Step 403. The IP PBX sends an invite message to the SIP Server.

The IP PBX sends the invite message to the SIP Server, where the invite message carries a terminal number and the IP address of the terminal, and the invite message is used to instruct the SIP Server to control the working recording server to connect to a voice site.

Step 404. The IP PBX sends a SIP message SIP INFO to the SIP Server.

The SIP INFO is used to instruct the SIP Server to determine a working recording server that is acquiring an unencrypted media stream using a mirrored port by means of mirrored packet capture, so that the SIP Server controls the working recording server to stop acquiring an unencrypted media stream from a mirror switch, and before the SIP Server replies with a recording switching success response after the SIP Server receives the SIP INFO, the working recording server acquires a call media stream from the mirror switch according to the IP address of the terminal.

Step 405. After receiving an invite response that includes an IP address and a number of a port for transmitting a media stream that are of a working recording server and that is returned by the SIP Server, the IP PBX connects the working recording server to a voice site according to the IP address and the port number that are of the working recording server.

Step 406. The IP PBX controls the multiple terminals that are in the same call to change the medium used in the call into an encrypted medium by means of renegotiation.

The IP PBX controls the multiple terminals that are in the same call to change the medium used in the call into an encrypted medium by means of renegotiation, separately decrypts received media streams that are sent by the multiple terminals that are in the same call, to obtain decrypted media streams, performs audio mixing on the decrypted media streams, and sends the decrypted media streams on which audio mixing is performed to the working recording server using the IP address and the port number.

Step 407. The IP PBX sends a second recording indication to the SIP Server.

The second recording indication is used to instruct the SIP Server to control the working recording server to stop acquiring, from the mirrored port of the mirror switch, the unencrypted media stream that is generated when the multiple terminals have the call, and start to store, corresponding to the IP address of the terminal, the received media stream that is generated when the multiple terminals have the call and that is sent by the IP PBX.

In this embodiment of the present disclosure, an IP PBX sends a first recording indication to a SIP Server, so that the SIP Server selects a recording server connected to a mirrored port of a mirror switch, and before the SIP Server replies with a switching success response after the SIP Server receives SIP INFO, the recording server acquires an unencrypted call media stream according to a terminal identifier, thereby implementing recording of a call during a period from when a voice site is created to when the recording server is connected to the voice site, and ensuring completeness of the recording. When the recording server is successfully connected to the voice site, the IP PBX sends a second recording indication to the SIP Server, so that the recording server switches to a recording manner in which an encrypted call media stream sent by the IP PBX is directly received. In addition, combination of the two recording manners ensures completeness of call recording in a process of on-demand recording by a user.

Figure 5:
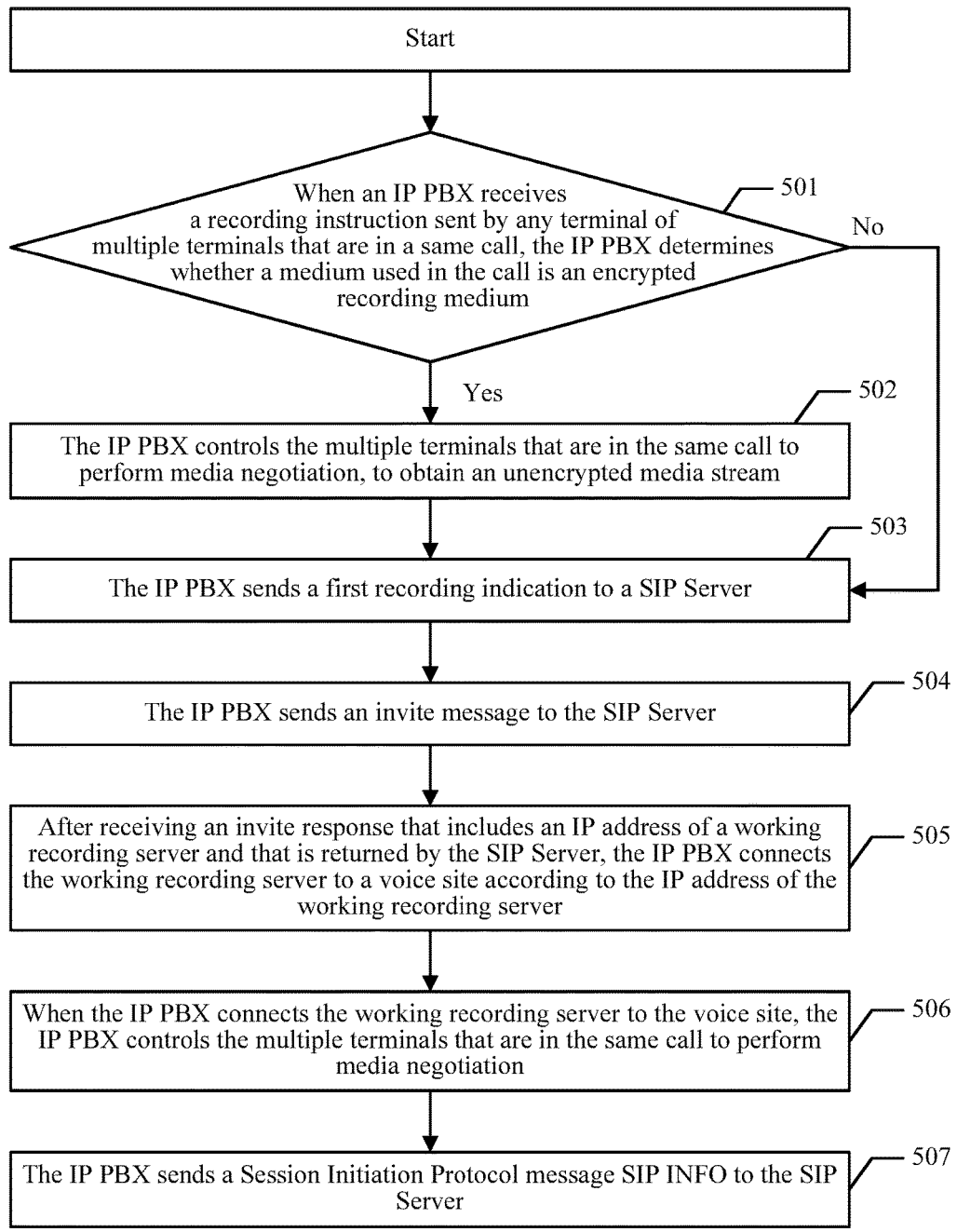
FIG. 5 is a schematic diagram of another embodiment of a recording method according to this embodiment.

Referring to FIG. 5, another embodiment of a recording method in the embodiments of the present disclosure includes the following steps.

Step 501. When an IP PBX receives a recording instruction sent by any terminal of multiple terminals that are in a same call, the IP PBX determines whether a medium used in the call is an encrypted recording medium.

The IP PBX determines, according to whether a secure audio video profile (SAVP) identifier exists in a media stream that is generated when the multiple terminals that are in the same call have the call, whether the medium used in the call is an encrypted recording medium.

If yes, go to step 502; if not, go to step 503.

Step 502. The IP PBX controls the multiple terminals that are in the same call to perform media negotiation, to obtain an unencrypted media stream.

The IP PBX controls the multiple terminals that are in the same call to perform media negotiation, so that the medium is changed into an unencrypted Real-time Transport Protocol (RTP) medium by means of negotiation. Subsequently, a media stream transmitted among the multiple terminals is an unencrypted media stream, and correspondingly, a media stream acquired from a mirror switch by a working recording server according to an IP address of the terminal is unencrypted.

The IP PBX may further add an audio video profile (AVP) identifier of the medium to the media stream that is generated when the multiple terminals that are in the same call have the call, to indicate that the media stream is an unencrypted media stream.

Step 503. The IP PBX sends a first recording indication to a SIP Server.

The first recording indication includes an IP address of the terminal and a terminal number. The IP PBX sends the first recording indication to the SIP Server, so that the SIP Server selects, from at least one recording server, a recording server connected to a mirrored port of a local area network switch, as a working recording server for recording, and that the SIP Server controls the working recording server to perform, according to the IP address of the terminal using the mirrored port connected to the working recording server, mirrored packet capture on a data packet corresponding to the IP address of the terminal, to acquire an unencrypted media stream that is generated when the multiple terminals that are in the same call have the call, and store, corresponding to the terminal number, the unencrypted media stream that is generated when the multiple terminals that are in the same call have the call.

Step 504. The IP PBX sends an invite message to the SIP Server.

The IP PBX sends the invite message to the SIP Server, where the invite message carries the terminal number and the IP address of the terminal, and the invite message is used to instruct the SIP Server to control the working recording server to connect to a voice site.

Step 505. After receiving an invite response that includes an IP address and a port number that are of a working recording server and that is returned by the SIP Server, the IP PBX connects the working recording server to a voice site according to the IP address and the port number that are of the working recording server.

Step 506. When the IP PBX connects the working recording server to the voice site, the IP PBX controls the multiple terminals that are in the same call to perform media negotiation.

The IP PBX controls the multiple terminals that are in the same call to perform media negotiation, so that the medium is changed into an encrypted Secure Real-time Transport Protocol (SRTP) medium by means of negotiation, and adds an SAVP identifier to a media stream, to indicate that the media stream is an encrypted media stream.

Step 507. The IP PBX sends a Session Initiation Protocol message SIP INFO to the SIP Server.

The SIP INFO carries a second recording indication, where the second recording indication is used to instruct the SIP Server to control the working recording server to receive a media stream that is sent by the IP PBX using the IP address and the port number that are of the working recording server, so that the working recording server stores, corresponding to the terminal number carried in the invite message received in step 504, the unencrypted media stream.

The SIP Server determines, according to a terminal identifier, a working recording server that is acquiring an unencrypted media stream using a mirrored port by means of mirrored packet capture, and instructs the working recording server to stop acquiring an unencrypted media stream from a mirror switch, and before the SIP Server replies with a recording switching success response after the SIP Server receives SIP INFO, the working recording server acquires an unencrypted call media stream according to an IP address of a terminal.

In this embodiment of the present disclosure, when receiving a recording instruction sent by a terminal, an IP PBX determines whether a media stream generated by the terminal is an encrypted media stream, to determine whether a type of the media stream needs to be converted, to ensure that a recording server can acquire a media stream according to an IP address of the terminal, so that an earlier segment of recording is not lost. The IP PBX sends a first recording indication to a SIP Server, so that the SIP Server selects a recording server connected to a mirrored port of a mirror switch, and before the SIP Server replies with a switching success response after the SIP Server receives SIP INFO, the recording server acquires an unencrypted call media stream according to a terminal identifier, thereby implementing recording of a call during a period from when a voice site is created to when the recording server is connected to the voice site, and ensuring completeness of the recording. When the recording server is successfully connected to the voice site, the IP PBX sends a second recording indication to the SIP Server, so that the recording server switches to a recording manner in which a call media stream is acquired directly from the IP PBX. Combination of the two recording manners ensures completeness of call recording in a process of on-demand recording by a user.

Figure 6:
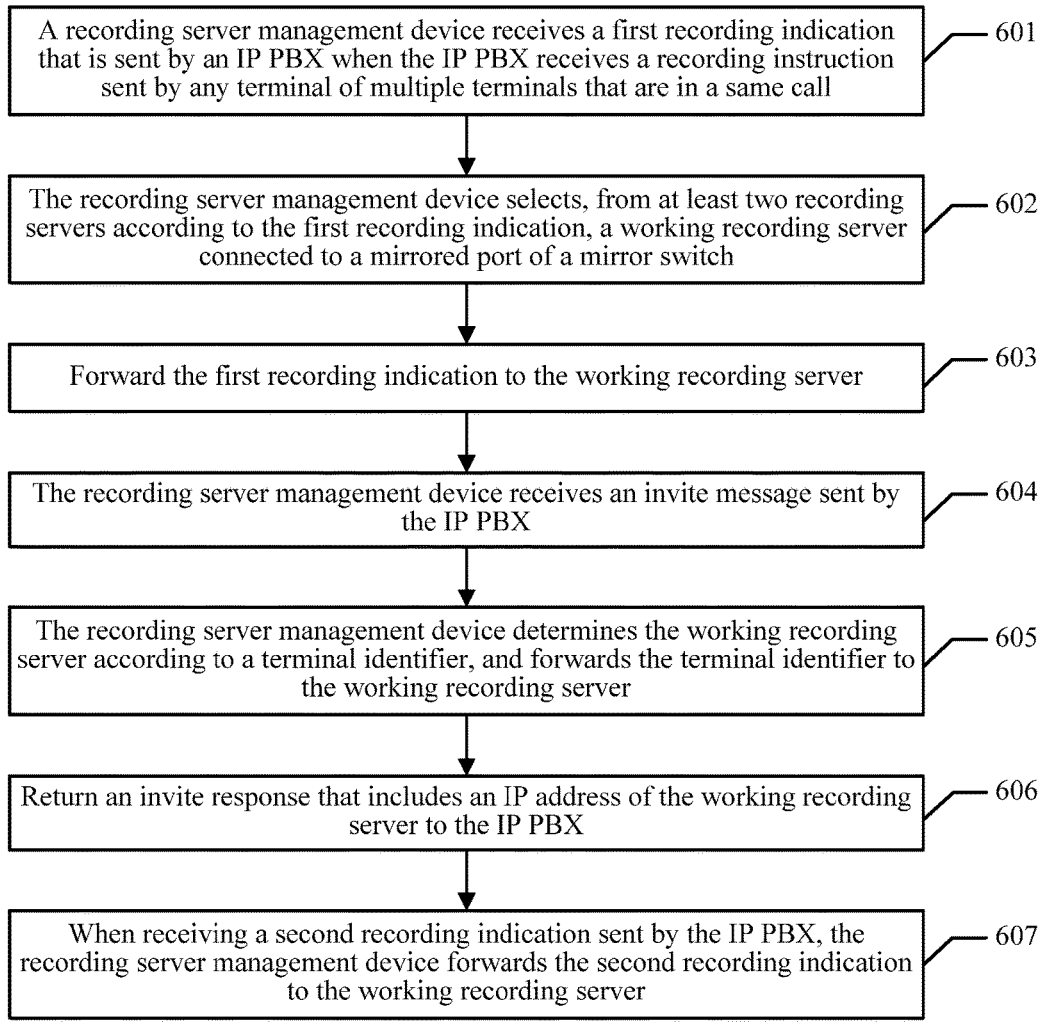
FIG. 6 is a schematic diagram of another embodiment of a recording method according to this embodiment.

In the foregoing embodiments, a recording method according to the present disclosure is described in detail using a voice switch IP PBX as an execution body. A recording method according to the present disclosure may also be described using a SIP Server as an execution body. Referring to FIG. 6, another embodiment of a recording method in the embodiments of the present disclosure includes the following steps.

Step 601. A recording server management device receives a first recording indication that is sent by an IP PBX when the IP PBX receives a recording instruction sent by any terminal of multiple terminals that are in a same call.

The first recording indication includes a terminal identifier of any terminal.

Step 602. The recording server management device selects, from at least two recording servers according to the first recording indication, a working recording server connected to a mirrored port of a mirror switch.

Step 603. Forward the first recording indication to the working recording server.

The first recording indication is used to instruct the working recording server to acquire, from the mirror switch according to the terminal identifier of the any terminal using the mirrored port, a media stream that is generated when the multiple terminals that are in the same call have the call, and store, corresponding to the terminal identifier, the media stream that is generated when the multiple terminals that are in the same call have the call.

Step 604. The recording server management device receives an invite message sent by the IP PBX.

The invite message includes the terminal identifier.

Step 605. The recording server management device determines the working recording server according to a terminal identifier, and forwards the terminal identifier to the working recording server.

Step 606. Return an invite response that includes an IP address and a port number that are of the working recording server to the IP PBX.

The invite response that includes the IP address and the port number that are of the working recording server is returned to the IP PBX, so that the IP PBX sends, to the working recording server using the IP address and the port number, the media stream that is generated when the multiple terminals that are in the same call have the call.

Step 607. When receiving a second recording indication sent by the IP PBX, the recording server management device forwards the second recording indication to the working recording server.

The second recording indication is used to instruct the working recording server to stop acquiring, from the mirror switch, the media stream that is generated when the multiple terminals that are in the same call have the call, start to receive a media stream that is generated when the multiple terminals that are in the same call have the call and that is sent by the IP PBX, and store, corresponding to the terminal identifier, the media stream that is generated when the multiple terminals that are in the same call have the call.

In this embodiment of the present disclosure, when receiving a first recording indication sent by an IP PBX, the recording server management device selects a recording server connected to a mirrored port of a mirror switch, and controls the recording server to acquire a call media stream according to a terminal identifier before the recording server receives a second recording indication, so that a call is recorded immediately after a call terminal sends a recording instruction, avoiding that a recording is lost due to delayed recording. After receiving a second recording indication sent by the IP PBX, the recording server management device controls the recording server to switch to a recording manner in which a call media stream sent by the IP PBX is directly received. Combination of the two recording manners resolves problems in the prior art that on-demand recording cannot be implemented and that a recording is incomplete due to a delay.

Figure 7:
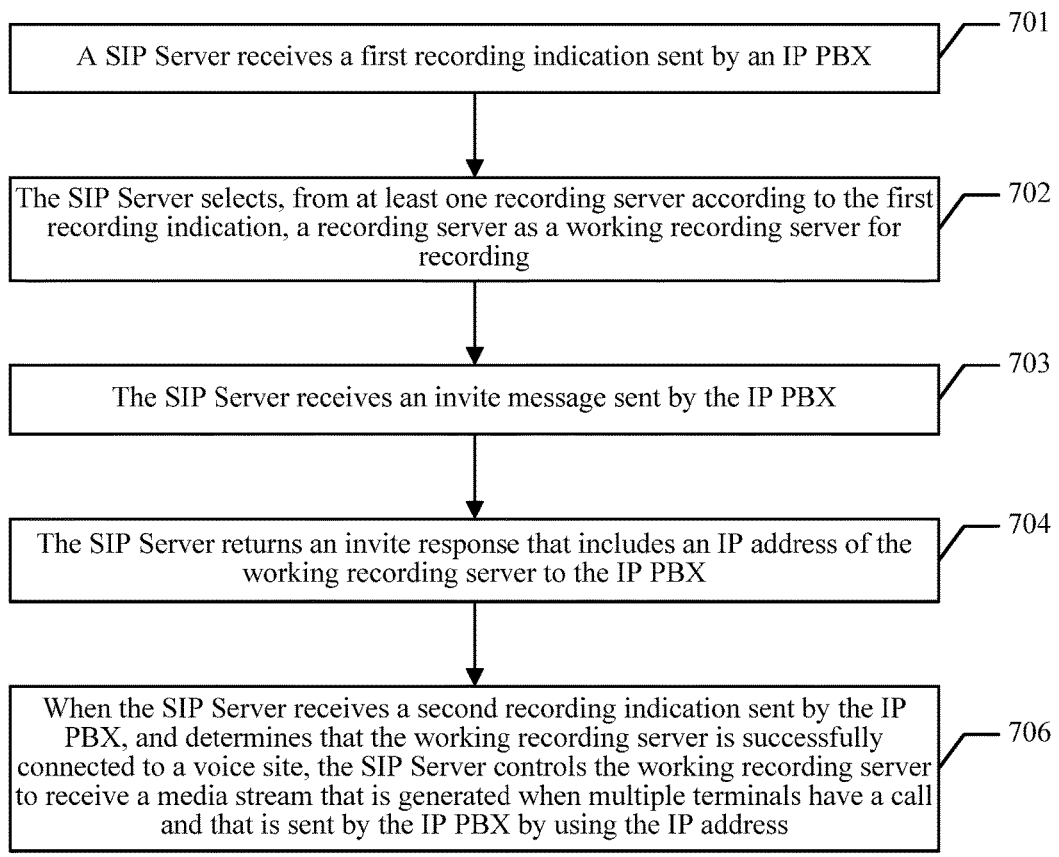
FIG. 7 is a schematic diagram of another embodiment of a recording method according to this embodiment.

Referring to FIG. 7, another embodiment of a recording method in the embodiments of the present disclosure includes the following steps.

Step 701. A SIP Server receives a first recording indication sent by an IP PBX.

The SIP Server receives the first recording indication that is sent by the IP PBX after the IP PBX receives a recording instruction sent by any terminal of multiple terminals that are in a same call.

Step 702. The SIP Server selects, from at least one recording server according to the first recording indication, a recording server as a working recording server for recording.

The first recording indication includes an IP address of the terminal, and the SIP Server selects, from the at least one recording server according to the first recording indication, a recording server that has lowest load and that is connected to a mirrored port of a mirror switch, as the working recording server for recording, so that the working recording server acquires, according to the IP address of the terminal, a media stream that is generated when the multiple terminals that are in the same call have the call, and stores, corresponding to a terminal identifier, the media stream that is generated when the multiple terminals that are in the same call have the call.

Step 703. The SIP Server receives an invite message sent by the IP PBX.

The invite message is used to instruct the SIP Server to control the working recording server to connect to a voice site that includes the multiple terminals that are in the same call.

Step 704. The SIP Server returns an invite response that includes an IP address and a port number that are of the working recording server to the IP PBX.

The SIP Server returns the invite response that includes the IP address and the port number that are of the working recording server to the IP PBX according to the received invite message.

Step 705. When the SIP Server receives a second recording indication sent by the IP PBX, and determines that the working recording server is successfully connected to a voice site, the SIP Server controls the working recording server to store, corresponding to an IP address of the terminal, a received media stream that is generated when multiple terminals have a call and that is sent by the IP PBX using the IP address and the port number that are of the working recording server.

When the SIP Server receives the second recording indication, and determines that the working recording server is successfully connected to the voice site, the SIP Server controls the working recording server to stop acquiring, from the mirror switch according to the terminal identifier, the media stream that is generated when the multiple terminals that are in the same call have the call, and then controls the working recording server to store, corresponding to the IP address of the terminal, the received media stream that is generated when the multiple terminals have the call and that is sent by the IP PBX using the IP address and the port number that are of the working recording server.

In this embodiment of the present disclosure, when receiving a first recording indication sent by an IP PBX, a SIP Server selects a recording server connected to a mirrored port of a mirror switch, and controls the recording server to acquire a call media stream according to a terminal identifier before the recording server is connected to a voice site, thereby implementing recording of a call during a period from when the voice site is created to when the recording server is connected to the voice site. In addition, the SIP Server returns an IP address and a port number that are of the recording server to the IP PBX, so that the recording server is connected to the voice site. The SIP Server controls, according to a received second recording indication sent by the IP PBX, the recording server to switch to a recording manner in which a call media stream is acquired directly from the IP PBX. Combination of the two recording manners resolves a prior-art problem that a recording is incomplete because a call during a period from when a voice site is created to when a recording server is connected to the voice site cannot be recorded.

Figure 8:
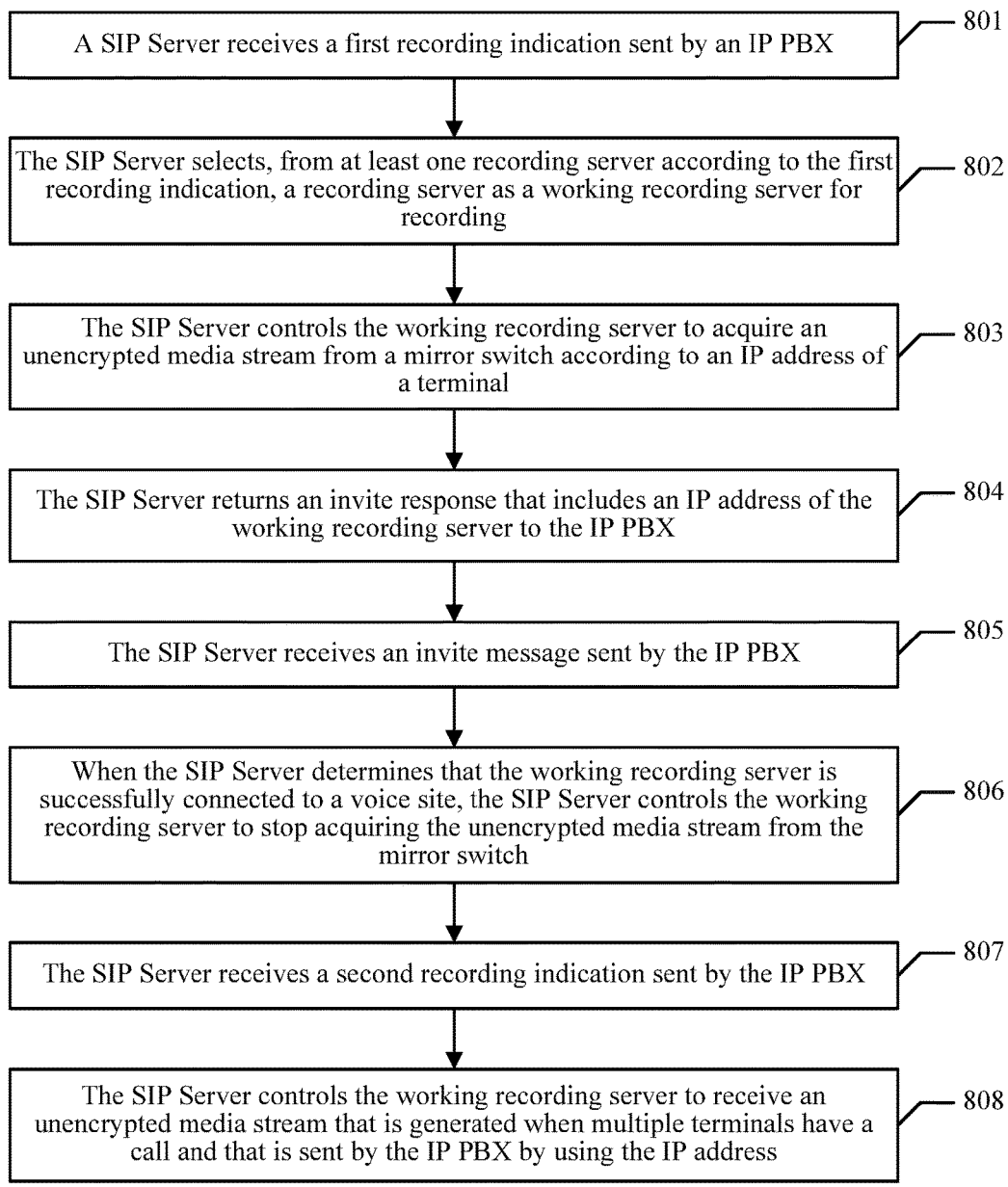
FIG. 8 is a schematic diagram of another embodiment of a recording method according to this embodiment.

Referring to FIG. 8, another embodiment of a recording method in the embodiments of the present disclosure includes the following steps.

Step 801. A SIP Server receives a first recording indication sent by an IP PBX.

The SIP Server receives the first recording indication that is sent by the IP PBX after the IP PBX receives a recording instruction sent by any terminal of multiple terminals that are in a same call.

Step 802. The SIP Server selects, from at least one recording server according to the first recording indication, a recording server as a working recording server for recording.

The SIP Server selects, from the at least one recording server according to the first recording indication, a recording server that has lowest load and that is connected to a mirrored port of a local area network switch as the working recording server for recording.

Step 803. The SIP Server controls the working recording server to acquire an unencrypted media stream from a mirror switch according to an IP address of a terminal.

The SIP Server controls the working recording server to acquire, according to the IP address, carried in the first recording indication, of the terminal, an unencrypted media stream that is generated when the multiple terminals that are in the same call have the call, and store, corresponding to a terminal number, the unencrypted media stream that is generated when the multiple terminals that are in the same call have the call.

Step 804. The SIP Server returns an invite response that includes an IP address and a port number that are of the working recording server to the IP PBX.

Step 805. The SIP Server receives an invite message sent by the IP PBX.

The invite message is used to instruct the SIP Server to control the working recording server to connect to a voice site that includes the multiple terminals that are in the same call.

Step 806. When determining that the working recording server is successfully connected to a voice site, the SIP Server controls the working recording server to stop acquiring the unencrypted media stream from the mirror switch.

Step 807. The SIP Server receives a second recording indication sent by the IP PBX.

Step 808. The SIP Server controls the working recording server to receive an unencrypted media stream that is generated when multiple terminals have a call and that is sent by the IP PBX using the IP address.

After the SIP Server returns, to the IP PBX, a recording switching success response indicating that the SIP Server stops controlling the working recording server to acquire the unencrypted media stream according to the IP address of the terminal and starts to control the working recording server to acquire an encrypted media stream from the IP PBX, the SIP Server controls the working recording server to acquire an encrypted media stream from the IP PBX.

In this embodiment of the present disclosure, when receiving a first recording indication sent by an IP PBX, a SIP Server selects a recording server connected to a mirrored port of a mirror switch, and controls the recording server to acquire an unencrypted media stream according to a terminal identifier before the recording server is connected to a voice site, thereby implementing recording of a call during a period from when the voice site is created to when the recording server is connected to the voice site, and ensuring completeness of the recording. When the recording server is connected to the voice site, the SIP Server controls, according to a received second recording indication sent by the IP PBX, the recording server to switch to a recording manner in which a decrypted media stream sent by the IP PBX is received. Combination of the two recording manners resolves a prior-art problem that a call during a period from when a voice site is created to when a recording server is connected to the voice site cannot be recorded.

Figure 9:
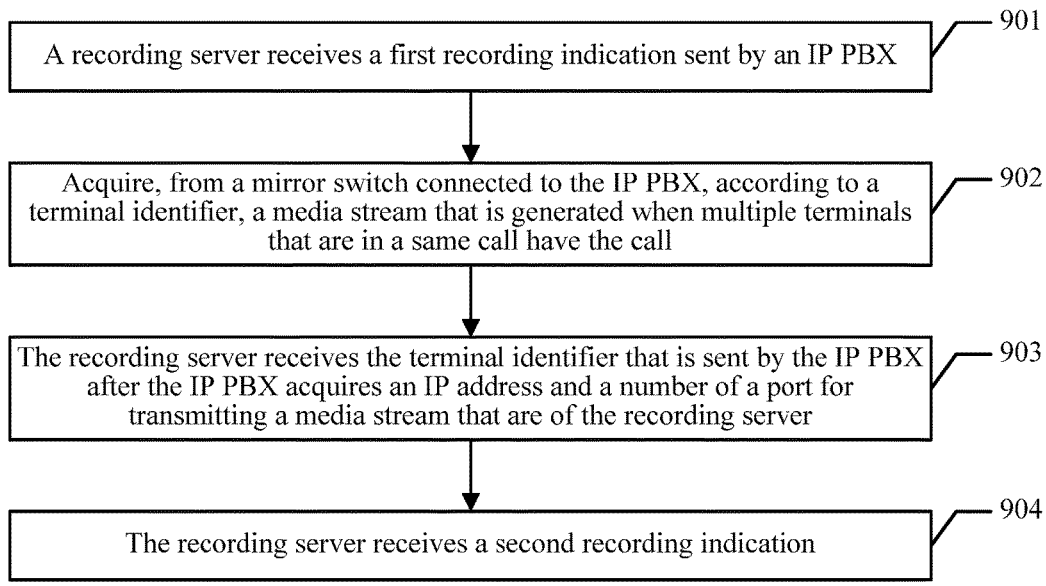
FIG. 9 is a schematic diagram of another embodiment of a recording method according to this embodiment.

In the foregoing embodiments, a recording method according to the present disclosure is described in detail by separately using a voice switch IP PBX and a SIP Server as execution bodies. A recording method according to the present disclosure may also be described using a recording server as an execution body. Referring to FIG. 9, another embodiment of a recording method in the embodiments of the present disclosure includes the following steps.

Step 901. A recording server receives a first recording indication sent by an IP PBX.

The first recording indication carries a terminal identifier of any terminal of multiple terminals that are in a same call.

Step 902. Acquire, from a mirror switch connected to the IP PBX, according to a terminal identifier, a media stream that is generated when multiple terminals that are in a same call have the call.

After the media stream is acquired, the media stream that is generated when the multiple terminals that are in the same call have the call is stored corresponding to the terminal identifier.

A specific implementation of storage based on a correspondence may be storing the media stream that is generated when the multiple terminals have the call, and recording a terminal identifier corresponding to the stored media stream as a terminal identifier carried in the first recording indication.

Step 903. The recording server receives a media stream that is generated when the multiple terminals that are in the same call have the call and that is sent by the IP PBX after the IP PBX acquires an IP address and a number of a port for transmitting the media stream that are of the recording server, where the IP PBX sends the media stream using the IP address and the port number.

Step 904. The recording server receives the terminal identifier and a second recording indication that are sent by the IP PBX; and according to the second recording indication, stops acquiring, from the mirror switch, the media stream that is generated when the multiple terminals that are in the same call have the call, starts to receive the media stream that is generated when the multiple terminals that are in the same call have the call and that is sent by the IP PBX using the IP address and the port number, and stores, corresponding to the terminal identifier, the media stream that is generated when the multiple terminals that are in the same call have the call.

The recording server may determine, according to the terminal identifier, a medium that corresponds to the terminal identifier and that is stored in step 902, and store a medium stored in step 904 and the medium stored in step 902 together to form a complete media file corresponding to the call.

In this embodiment of the present disclosure, before a recording server is connected to a voice site, a media stream is acquired from a mirror switch according to a terminal identifier, thereby implementing recording of a call during a period from when the voice site is created to when the recording server is connected to the voice site, and ensuring completeness of the recording. When the recording server is connected to the voice site, the recording server acquires a media stream from an IP PBX according to a second recording indication sent by the IP PBX. Combination of the two recording manners resolves a prior-art problem that a call before a recording server is connected to a voice site cannot be recorded.

Figure 10:
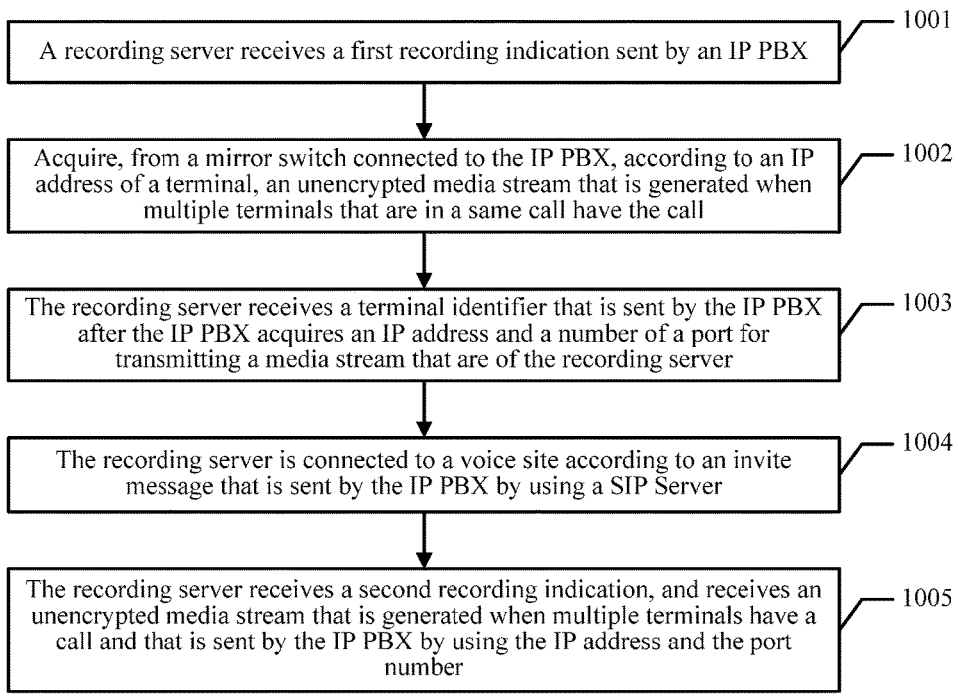
FIG. 10 is a schematic diagram of another embodiment of a recording method according to this embodiment.

Referring to FIG. 10, another embodiment of a recording method in the embodiments of the present disclosure includes the following steps.

Step 1001. A recording server receives a first recording indication sent by an IP PBX.

The first recording indication carries an IP address of any terminal of multiple terminals that are in a same call.

Step 1002. Acquire, from a mirror switch connected to the IP PBX, according to an IP address of a terminal, an unencrypted media stream that is generated when multiple terminals that are in a same call have the call.

After the unencrypted media stream is acquired, the unencrypted media stream is stored corresponding to the IP address of the terminal.

Step 1003. The recording server receives a terminal identifier that is sent by the IP PBX after the IP PBX acquires an IP address and a number of a port for transmitting a media stream that are of the recording server.

Step 1004. The recording server is connected to a voice site according to an invite message that is sent by the IP PBX using a SIP Server.

Step 1005. The recording server receives a second recording indication, and receives an unencrypted media stream that is generated when the multiple terminals have the call and that is sent by the IP PBX using the IP address and the port number. According to the second recording indication, the recording server stops acquiring, from the mirror switch, the media stream that is generated when the multiple terminals have the call, starts to receive the unencrypted media stream that is generated when the multiple terminals have the call and that is sent by the IP PBX using the IP address and the port number, and stores, corresponding to the IP address of the terminal, the unencrypted media stream.

In this embodiment of the present disclosure, before a recording server is connected to a voice site, an unencrypted media stream is acquired from a mirror switch according to an IP address of a terminal, thereby implementing recording of a call before the recording server is connected to the voice site, and ensuring completeness of the recording. After the recording server is connected to the voice site, the recording server receives, according to a second recording indication, an unencrypted media stream that is generated when multiple terminals have a call and that is sent by an IP PBX using an IP address and a port number. Combination of the two recording manners resolves a prior-art problem that a call before a recording server is connected to a voice site cannot be recorded.

Figure 11:
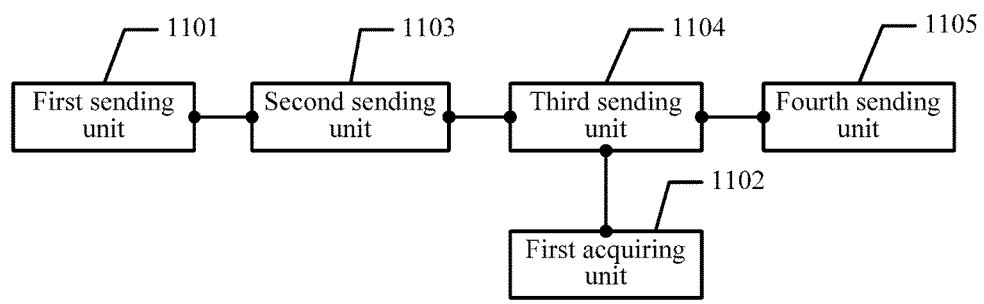
FIG. 11 is a schematic diagram of an embodiment of a voice switch according to this embodiment.

Referring to FIG. 11, an embodiment of an IP private branch exchange IP PBX in the embodiments of the present disclosure includes a first sending unit 1101 configured to, when a recording instruction sent by any terminal of multiple terminals that are in a same call is received, send a first recording indication to a working recording server, which is connected to a mirrored port of a mirror switch, of at least one recording server, where the first recording indication includes a terminal identifier of the any terminal of the multiple terminals, and the first recording indication is used to instruct the working recording server to acquire, from the mirror switch according to the terminal identifier using the mirrored port, a media stream that is generated when the multiple terminals that are in the same call have the call, and store, corresponding to the terminal identifier, the media stream that is generated when the multiple terminals that are in the same call have the call; a first acquiring unit 1102 configured to acquire an IP address and a number of a port for transmitting the media stream that are of the working recording server; a second sending unit 1103 configured to send the terminal identifier to the working recording server; a third sending unit 1104 configured to send, to the working recording server using the IP address and the port number, the media stream that is generated when the multiple terminals that are in the same call have the call, and send a second recording indication to the working recording server, to instruct the working recording server to stop acquiring, from the mirror switch, the media stream that is generated when the multiple terminals that are in the same call have the call; and a fourth sending unit 1105 configured to send, to the working recording server, the media stream that is generated when the multiple terminals that are in the same call have the call, so that the working recording server stores, corresponding to the terminal identifier, the media stream that is generated when the multiple terminals that are in the same call have the call.

In this embodiment of the present disclosure, when a recording instruction sent by a terminal is received, a first sending unit 1101 sends a first recording indication to a working recording server connected to a mirrored port of a mirror switch, so that the recording server acquires a call media stream according to a terminal identifier, and a call is recorded immediately after the recording instruction is received, thereby ensuring completeness of the recording. A third sending unit 1104 sends a second recording indication to a recording system, and a fourth sending unit 1105 sends a media stream to the recording server, thereby resolving a problem of incomplete recording caused by a delay.

Figure 12:
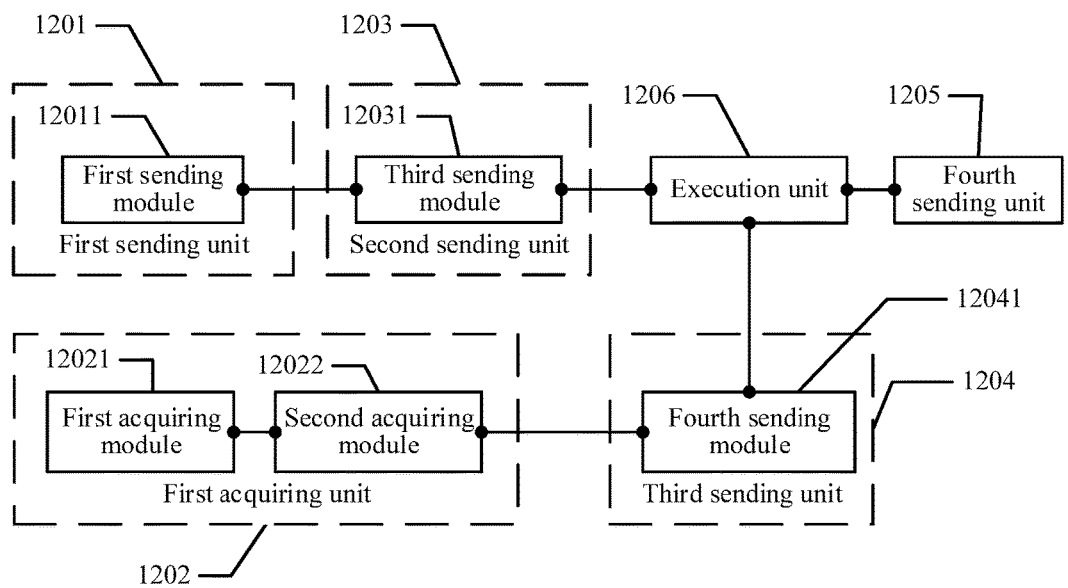
FIG. 12 is a schematic diagram of another embodiment of a voice switch according to this embodiment.

Referring to FIG. 12, another embodiment of an IP PBX in the embodiments of the present disclosure includes a first sending unit 1201 configured to, when a recording instruction sent by any terminal of multiple terminals that are in a same call is received, send a first recording indication to a working recording server, which is connected to a mirrored port of a mirror switch, of at least one recording server, where the first recording indication includes a terminal identifier of the any terminal, and the first recording indication is used to instruct the working recording server to acquire, from the mirror switch according to the terminal identifier using the mirrored port, a media stream that is generated when the multiple terminals that are in the same call have the call, and store, corresponding to the terminal identifier, the media stream that is generated when the multiple terminals that are in the same call have the call; a first acquiring unit 1202 configured to acquire an IP address and a number of a port for transmitting the media stream that are of the working recording server; a second sending unit 1203 configured to send the terminal identifier to the working recording server; a third sending unit 1204 configured to send, to the working recording server using the IP address and the port number, the media stream that is generated when the multiple terminals that are in the same call have the call, and send a second recording indication to the working recording server, to instruct the working recording server to stop acquiring, from the mirror switch, the media stream that is generated when the multiple terminals that are in the same call have the call; and a fourth sending unit 1205 configured to send, to the working recording server, the media stream that is generated when the multiple terminals that are in the same call have the call, so that the working recording server stores, corresponding to the terminal identifier, the media stream that is generated when the multiple terminals that are in the same call have the call.

In this embodiment of the present disclosure, the IP PBX may further include an execution unit 1206 configured to, after an invite response that includes the IP address and the port number that are of the recording server and that is returned by a working recording server management device, connect the recording server to a voice site according to the IP address and the port number that are of the working recording server.

In this embodiment of the present disclosure, the first sending unit 1201 includes a first sending module 12011 configured to send the first recording indication to the recording server management device, so that the recording server management device selects, from at least two recording servers according to the first recording indication, the working recording server connected to the mirrored port of the mirror switch, and forwards the first recording indication to the working recording server.

In this embodiment of the present disclosure, the second sending unit 1203 may further include a third sending module 12031 configured to add the terminal identifier to an invite message, and send the invite message to the recording server management device, so that the recording server management device determines the working recording server according to the terminal identifier, and sends the terminal identifier to the working recording server.

In this embodiment of the present disclosure, the first acquiring unit 1202 includes a first acquiring module 12021 configured to acquire the invite response that includes the IP address and the port number and that is returned by the recording server management device; and a second acquiring module 12022 configured to acquire the IP address and the port number from the invite response.

In this embodiment of the present disclosure, the third sending unit 1204 includes a fourth sending module 12041 configured to send the second recording indication to the working recording server using the recording server management device.

In this embodiment of the present disclosure, when a recording instruction sent by a terminal is received, a first sending module 12011 sends a first recording indication to a working recording server connected to a mirrored port of a mirror switch, so that the recording server acquires a call media stream according to a terminal identifier, and a call is recorded immediately after the recording instruction is received, thereby ensuring completeness of the recording. A fourth sending module 12041 sends a second recording indication to the working recording server, and the fourth sending unit 1205 sends a media stream to the recording server, thereby resolving a problem of incomplete recording caused by a delay.

Figure 13:
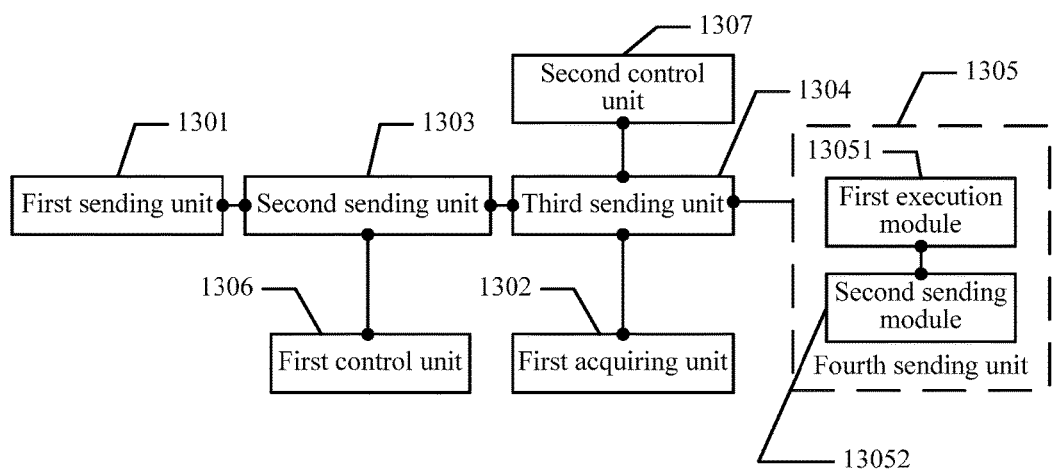
FIG. 13 is a schematic diagram of another embodiment of a voice switch according to this embodiment.

Referring to FIG. 13, another embodiment of an IP PBX in the embodiments of the present disclosure includes a first sending unit 1301 configured to, when a recording instruction sent by any terminal of multiple terminals that are in a same call is received, send a first recording indication to a working recording server, which is connected to a mirrored port of a mirror switch, of at least one recording server, where the first recording indication includes a terminal identifier of the any terminal, and the first recording indication is used to instruct the working recording server to acquire, from the mirror switch according to the terminal identifier using the mirrored port, a media stream that is generated when the multiple terminals that are in the same call have the call, and store, corresponding to the terminal identifier, the media stream that is generated when the multiple terminals that are in the same call have the call; a first acquiring unit 1302 configured to acquire an IP address and a number of a port for transmitting the media stream that are of the working recording server; a second sending unit 1303 configured to send the terminal identifier to the working recording server; a third sending unit 1304 configured to send, to the working recording server using the IP address and the port number, the media stream that is generated when the multiple terminals that are in the same call have the call, and send a second recording indication to the working recording server, to instruct the working recording server to stop acquiring, from the mirror switch, the media stream that is generated when the multiple terminals that are in the same call have the call; and a fourth sending unit 1305 configured to send, to the working recording server, the media stream that is generated when the multiple terminals that are in the same call have the call, so that the working recording server stores, corresponding to the terminal identifier, the media stream that is generated when the multiple terminals that are in the same call have the call.

In this embodiment of the present disclosure, the IP PBX further includes a first control unit 1306 configured to, when it is determined that a medium used by the terminals in the same call to have the call is an encrypted medium, control the terminals in the same call to change the medium used in the call into an unencrypted medium by means of negotiation; and a second control unit 1307 configured to control the terminals in the same call to change the medium used in the call into an encrypted medium by means of renegotiation.

Further, the fourth sending unit 1305 includes a first execution module 13051 configured to separately decrypt received media streams that are sent by the multiple terminals that are in the same call, to obtain decrypted media streams; and a second sending module 13052 configured to perform audio mixing on the decrypted media streams, and send the decrypted media streams on which audio mixing is performed to the working recording server using the IP address and the port number.

In this embodiment of the present disclosure, when a recording instruction sent by a terminal is received, a first sending unit 1301 sends a first recording indication to a recording system, so that a SIP Server selects a recording server connected to a mirrored port of a mirror switch, and the recording server acquires an unencrypted call media stream according to a terminal identifier, thereby implementing recording of a call before the recording server is connected to a voice site, and ensuring completeness of the recording. When the recording server is successfully connected to the voice site, a third sending unit 1304 sends a second recording indication to the SIP Server, and a fourth sending unit 1305 sends an encrypted media stream to the recording server, so that the recording server switches a recording manner, which greatly improves security of the recording, and ensures completeness of call recording in a process of on-demand recording by a user.

Figure 14:
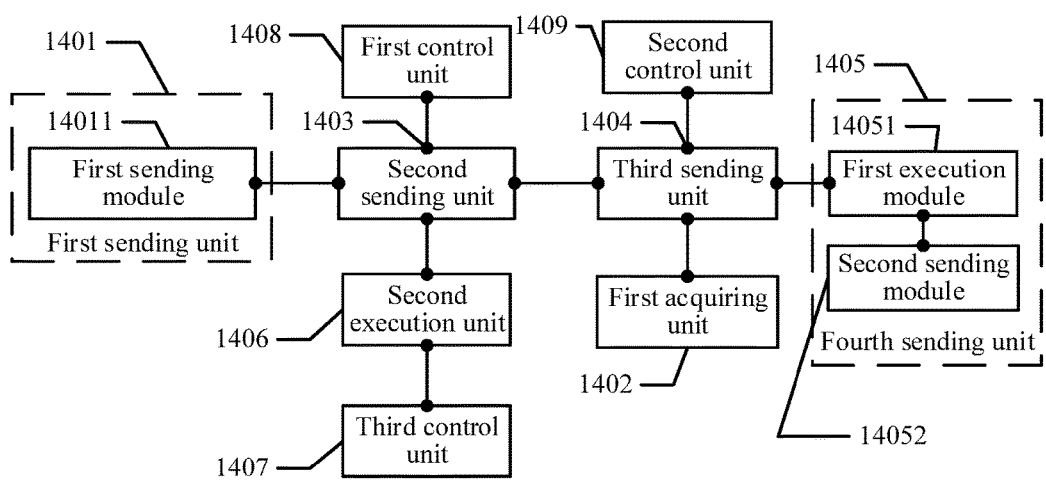
FIG. 14 is a schematic diagram of another embodiment of a voice switch according to this embodiment.

Referring to FIG. 14, another embodiment of an IP PBX in the embodiments of the present disclosure includes a first sending unit 1401 configured to, when a recording instruction sent by any terminal of multiple terminals that are in a same call is received, send a first recording indication to a working recording server, which is connected to a mirrored port of a mirror switch, of at least one recording server, where the first recording indication includes a terminal identifier of the any terminal, and the first recording indication is used to instruct the working recording server to acquire, from the mirror switch according to the terminal identifier using the mirrored port, a media stream that is generated when the multiple terminals that are in the same call have the call, and store, corresponding to the terminal identifier, the media stream that is generated when the multiple terminals that are in the same call have the call; a first acquiring unit 1402 configured to acquire an IP address and a number of a port for transmitting the media stream that are of the working recording server; a second sending unit 1403 configured to send the terminal identifier to the working recording server; a third sending unit 1404 configured to send, to the working recording server using the IP address and the port number, the media stream that is generated when the multiple terminals that are in the same call have the call, and send a second recording indication to the working recording server, to instruct the working recording server to stop acquiring, from the mirror switch, the media stream that is generated when the multiple terminals that are in the same call have the call; and a fourth sending unit 1405 configured to send, to the working recording server, the media stream that is generated when the multiple terminals that are in the same call have the call, so that the working recording server stores, corresponding to the terminal identifier, the media stream that is generated when the multiple terminals that are in the same call have the call.

In this embodiment of the present disclosure, the first sending unit 1401 includes a first sending module 14011 configured to send the first recording indication to the working recording server, so that the working recording server performs, using the mirrored port, which is connected to the working recording server, of the mirror switch, mirrored packet capture on a data packet corresponding to an IP address of the terminal, to acquire the media stream that is generated when the multiple terminals that are in the same call have the call.

In this embodiment of the present disclosure, the IP PBX further includes a second execution unit 1406 configured to, after the recording instruction is received, create, according to the terminal identifier, a voice site that includes the terminals that are in the same call; and a third control unit 1407 configured to connect, according to the IP address and the port number that are of the working recording server, the working recording server to the voice site that includes the multiple terminals that are in the same call.

In this embodiment of the present disclosure, the IP PBX further includes a first control unit 1408 configured to, when it is determined that a medium used by the terminals in the same call to have the call is an encrypted medium, control the terminals in the same call to change the medium used in the call into an unencrypted medium by means of negotiation; and a second control unit 1409 configured to control the terminals in the same call to change the medium used in the call into an encrypted medium by means of renegotiation.

In this embodiment of the present disclosure, the fourth sending unit 1405 includes a first execution module 14051 configured to separately decrypt received media streams that are sent by the multiple terminals that are in the same call, to obtain decrypted media streams; and a second sending module 14052 configured to perform audio mixing on the decrypted media streams, and send the decrypted media streams on which audio mixing is performed to the working recording server using the IP address and the port number.

In this embodiment of the present disclosure, when a first sending module 14011 receives a recording instruction sent by a terminal, and when the first sending module 14011 sends a first recording indication to a working recording server, a first control unit 1408 controls terminals that are in a same call to change a medium used in the call into an unencrypted medium by means of negotiation, so that the working recording server acquires an unencrypted call media stream according to a terminal identifier, thereby implementing recording of the call before the recording server is connected to a voice site, and ensuring completeness of the recording. A second control unit 1409 performs renegotiation for the medium when a fourth sending unit 1405 sends a second recording indication, and after a first execution module 14051 decrypts media streams, a second sending module 14052 performs audio mixing on the decrypted media streams, and sends the decrypted media streams on which audio mixing is performed to the working recording server using an IP address and a port number, thereby ensuring completeness of call recording in a process of on-demand recording by a user.

Figure 15:
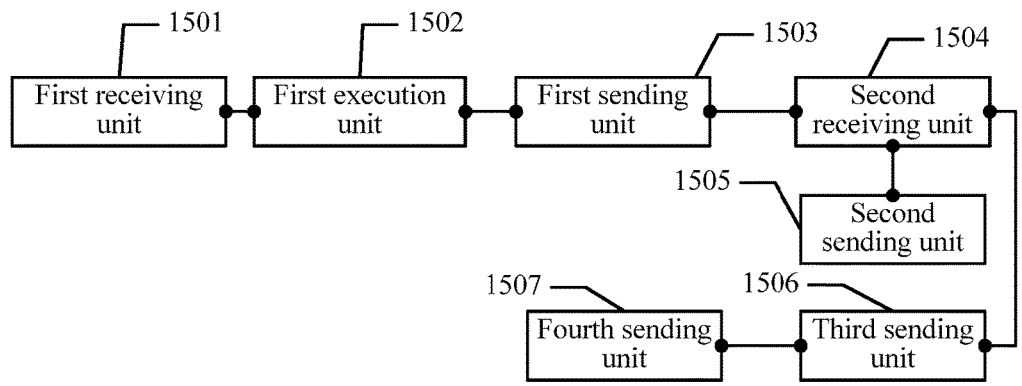
FIG. 15 is a schematic diagram of an embodiment of a recording server management device according to this embodiment.

Referring to FIG. 15, an embodiment of a recording server management device in the embodiments of the present disclosure includes a first receiving unit 1501 configured to receive a first recording indication that is sent by an IP PBX when the IP PBX receives a recording instruction sent by any terminal of multiple terminals that are in a same call, where the first recording indication includes a terminal identifier of the any terminal of the multiple terminals; a first execution unit 1502 configured to select, from at least two recording servers according to the first recording indication, a working recording server connected to a mirrored port of a mirror switch; a first sending unit 1503 configured to forward the first recording indication to the working recording server, to instruct the working recording server to acquire, from the mirror switch according to the terminal identifier of the any terminal, a media stream that is generated when the multiple terminals that are in the same call have the call, and store, corresponding to the terminal identifier, the media stream that is generated when the multiple terminals that are in the same call have the call; a second receiving unit 1504 configured to receive an invite message sent by the IP PBX, where the invite message includes the terminal identifier; a second sending unit 1505 configured to determine the working recording server according to the terminal identifier, and forward the terminal identifier to the working recording server; a third sending unit 1506 configured to return, to the IP PBX, an invite response that includes an IP address and a port number that are of the working recording server, so that the IP PBX sends, to the working recording server using the IP address and the port number, the media stream that is generated when the multiple terminals that are in the same call have the call; and a fourth sending unit 1507 configured to, when a second recording indication sent by the IP PBX is received, forward the second recording indication to the working recording server, to instruct the working recording server to stop acquiring, from the mirror switch, the media stream that is generated when the multiple terminals that are in the same call have the call, start to receive a media stream that is generated when the multiple terminals that are in the same call have the call and that is sent by the IP PBX, and store, corresponding to the terminal identifier, the media stream that is generated when the multiple terminals that are in the same call have the call.

In this embodiment of the present disclosure, when a first receiving unit 1501 receives a first recording indication sent by an IP PBX, a first execution unit 1502 selects a recording server connected to a mirrored port of a mirror switch, and a first sending unit 1503 forwards the first recording indication to a working recording server, so that the working recording server acquires a call media stream according to a terminal identifier, thereby avoiding a problem of recording incompleteness caused by a delay due to interworking of multiple pieces of signaling. After receiving a second recording indication, a fourth sending unit 1507 controls the recording server to stop acquiring the call media stream from the mirror switch, and start to receive a call media stream sent by the IP PBX. Combination of the two recording manners ensures completeness of recording.

Figure 16:
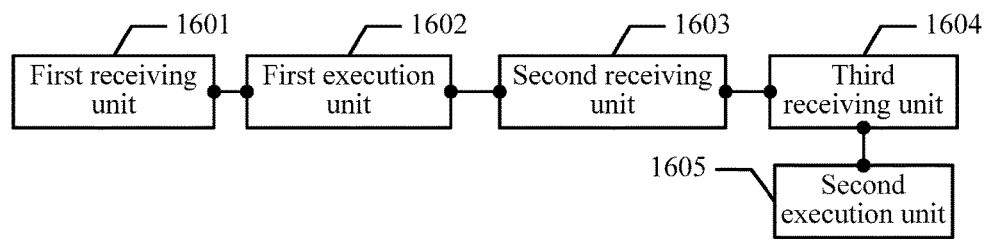
FIG. 16 is a schematic diagram of an embodiment of a recording server according to this embodiment.

Referring to FIG. 16, an embodiment of a recording server in the embodiments of the present disclosure includes a first receiving unit 1601 configured to receive a first recording indication sent by an IP PBX; a first execution unit 1602 configured to acquire, from a mirror switch connected to the IP PBX, according to a terminal identifier that is of any terminal of multiple terminals that are in a same call and that is carried in the first recording indication, a media stream that is generated when the multiple terminals that are in the same call have the call, and store, corresponding to the terminal identifier, the media stream that is generated when the multiple terminals that are in the same call have the call; a second receiving unit 1603 configured to receive the media stream that is generated when the multiple terminals that are in the same call have the call and that is sent by the IP PBX after the IP PBX acquires an IP address and a number of a port for transmitting the media stream that are of the recording server, where the IP PBX sends the media stream using the IP address and the port number; a third receiving unit 1604 configured to receive the terminal identifier and a second recording indication that are sent by the IP PBX, where the second recording indication is used to instruct the first execution unit to stop acquiring, according to the terminal identifier, the media stream that is generated when the multiple terminals have the call; and a second execution unit 1605 configured to, according to the second recording indication received by the third receiving unit 1604, stop acquiring, from the mirror switch, the media stream that is generated when the multiple terminals that are in the same call have the call, and start to store, corresponding to the terminal identifier, a media stream that is generated when the multiple terminals that are in the same call have the call and that is received from the IP PBX.

In this embodiment of the present disclosure, a first execution unit 1602 acquires a media stream from a mirror switch according to a terminal identifier and according to a first recording indication received by a first receiving unit 1601, thereby implementing recording of a call during a period from when on-demand recording is started to when a recording server is connected to a voice site, and ensuring completeness of the recording. When the recording server is connected to the voice site, a second execution unit 1605 acquires a media stream from an IP PBX according to a second recording indication received by a third receiving unit 1604. Combination of the two recording manners resolves a prior-art problem that a call cannot be completely recorded.

Figure 17:
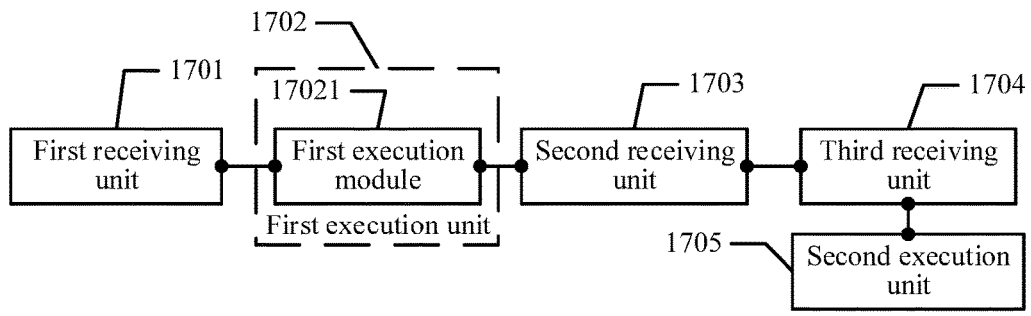
FIG. 17 is a schematic diagram of another embodiment of a recording server according to this embodiment.

Referring to FIG. 17, another embodiment of a recording server in the embodiments of the present disclosure includes a first receiving unit 1701 configured to receive a first recording indication sent by an IP PBX; a first execution unit 1702 configured to acquire, from a mirror switch connected to the IP PBX, according to a terminal identifier that is of any terminal of multiple terminals that are in a same call and that is carried in the first recording indication, a media stream that is generated when the multiple terminals that are in the same call have the call, and store, corresponding to the terminal identifier, the media stream that is generated when the multiple terminals that are in the same call have the call; a second receiving unit 1703 configured to receive the media stream that is generated when the multiple terminals that are in the same call have the call and that is sent by the IP PBX after the IP PBX acquires an IP address and a number of a port for transmitting the media stream that are of the recording server, where the IP PBX sends the media stream using the IP address and the port number; a third receiving unit 1704 configured to receive the terminal identifier and a second recording indication that are sent by the IP PBX, where the second recording indication is used to instruct the first execution unit to stop acquiring, according to the terminal identifier, the media stream that is generated when the multiple terminals have the call; and a second execution unit 1705 configured to, according to the second recording indication received by the third receiving unit, stop acquiring, from the mirror switch, the media stream that is generated when the multiple terminals that are in the same call have the call, and start to store, corresponding to the terminal identifier, a media stream that is generated when the multiple terminals that are in the same call have the call and that is received from the IP PBX.

In this embodiment of the present disclosure, the first execution unit 1702 includes a first execution module 17021 configured to perform, using a mirrored port, which is connected to the IP PBX, of the mirror switch, mirrored packet capture on a data packet corresponding to an IP address of the terminal and a port number, to acquire the media stream that is generated when the multiple terminals that are in the same call have the call.

In this embodiment of the present disclosure, a first execution module 17021 acquires a media stream from a mirror switch according to a terminal identifier and according to a first recording indication received by a first receiving unit 1701, thereby implementing recording of a call during a period from when on-demand recording is started to when a recording server is connected to a voice site, and ensuring completeness of the recording. When the recording server is connected to the voice site, a second execution unit 1705 acquires a media stream from an IP PBX according to a second recording indication received by a third receiving unit 1704. Combination of the two recording manners resolves a prior-art problem that a call cannot be completely recorded.

Figure 18:
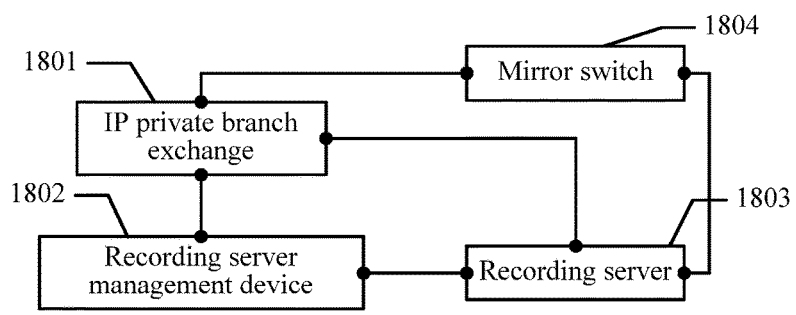
FIG. 18 is a schematic diagram of an embodiment of a recording system according to this embodiment.

The foregoing describes a recording method and apparatus in the embodiments of the present disclosure, and the following describes a recording system according to an embodiment of the present disclosure. Referring to FIG. 18, an embodiment of a recording system in the embodiments of the present disclosure includes an IP private branch exchange 1801 shown in any one of FIG. 11 to FIG. 14; and a recording server 1803 shown in either of FIG. 16 and FIG. 17.

Further, the system may further include a recording server management device 1802 shown in FIG. 15.

Further, the system may further include a mirror switch 1804.

In this embodiment of the present disclosure, after receiving a recording instruction sent by any terminal of multiple terminals that are in a same call, an IP private branch exchange 1801 sends a first recording indication and an invite message to a recording server management device 1802, and the recording server management device 1802 selects, from a recording server group, a recording server 1803 to perform recording, so that before the recording server 1803 is connected to a voice site according to the invite message, the recording server 1803 acquires a media stream from a mirrored port of the mirror switch 1804 according to a terminal identifier. After the recording server 1803 is connected to the voice site according to the invite message, the recording server 1803 acquires a media stream from the IP PBX 1801 according to a second recording indication, thereby resolving a prior-art problem that a recording is lost and incomplete because a call cannot be recorded before a recording server is connected to a site.

Figure 19:
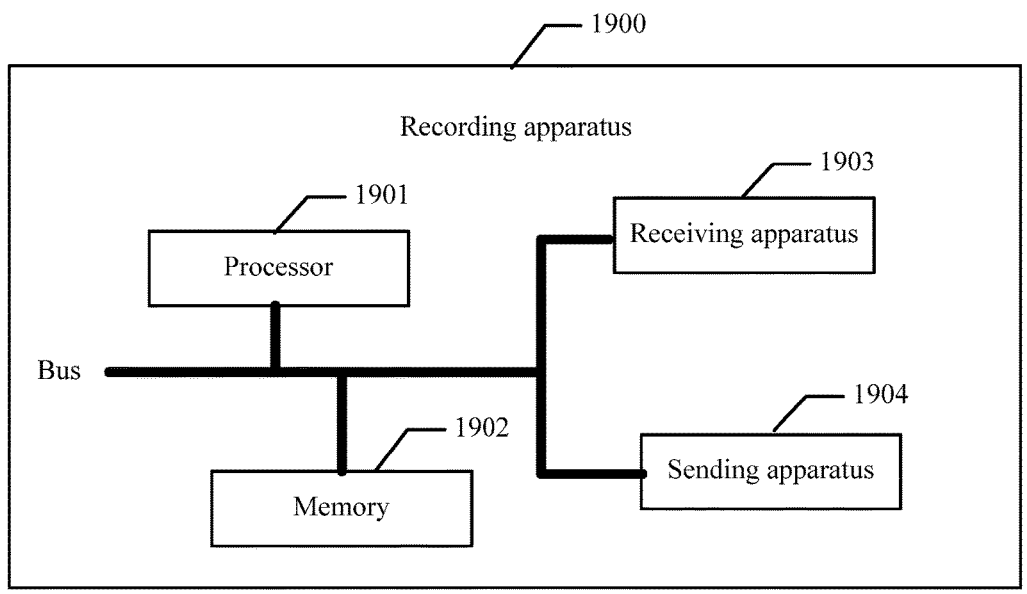
FIG. 19 is a schematic diagram of a physical apparatus of an IP private branch exchange according to this embodiment.

Referring to FIG. 19, FIG. 19 is another schematic structural diagram of a recording apparatus according to an embodiment of the present disclosure. The recording apparatus 1900 may include at least one processor 1901 (for example, a Central Processing Unit (CPU)), at least one network interface or another communications interface, a memory 1902, at least one communications bus, at least one receiving apparatus 1903, and at least one sending apparatus 1904, so as to implement connection and communication between these apparatuses. The processor 1901 is configured to execute an executable module, such as a computer program, stored in the memory 1902. The memory 1902 may include a high-speed random access memory (RAM), or may further include a non-volatile memory (non-volatile memory), for example, at least one magnetic disk memory. A communication connection between a system gateway and at least one other network element is implemented using at least one network interface (which may be wired or wireless), and the Internet, a wide area network, a local network, a metropolitan area network, and the like may be used.

As shown in FIG. 19, in some implementation manners, the memory 1902 stores a program instruction, the program instruction may be executed by the processor 1901, and the processor 1901 performs the following steps: when the receiving apparatus 1903 receives a recording instruction sent by any terminal of multiple terminals that are in a same call, sending, by the sending apparatus 1904, a first recording indication to a working recording server, which is connected to a mirrored port of a mirror switch, of at least one recording server, where the first recording indication includes a terminal identifier of the any terminal of the multiple terminals, and the first recording indication is used to instruct the working recording server to acquire, from the mirror switch according to the terminal identifier using the mirrored port, a media stream that is generated when the multiple terminals have the call, and store, corresponding to the terminal identifier, the media stream that is generated when the multiple terminals have the call; acquiring an IP address and a number of a port for transmitting the media stream that are of the working recording server; and sending, by the sending apparatus 1904, to the working recording server using the IP address and the port number, the media stream that is generated when the multiple terminals that are in the same call have the call, and sending the terminal identifier and a second recording indication to the working recording server, to instruct the working recording server to stop acquiring, from the mirror switch, the media stream that is generated when the multiple terminals that are in the same call have the call, and start to store, corresponding to the terminal identifier, the media stream that is generated when the multiple terminals have the call and that is received from the IP PBX.

In some implementation manners, the processor 1901 may further perform the following step: sending the first recording indication to the working recording server, so that the working recording server performs, using the mirrored port, which is connected to the working recording server, of the mirror switch, mirrored packet capture on a data packet corresponding to an IP address of the terminal, to acquire the media stream that is generated when the multiple terminals that are in the same call have the call, and stores, corresponding to the IP address of the terminal, the media stream that is generated when the multiple terminals that are in the same call have the call in the memory 1902.

In some implementation manners, the processor 1901 may further perform the following steps: controlling the sending apparatus 1904 to send the first recording indication to a recording server management device, so that the recording server management device selects, from at least two recording servers according to the first recording indication, the working recording server connected to the mirrored port of the mirror switch, and forwards the first recording indication to the working recording server; controlling the sending apparatus 1904 to send an invite message to the recording server management device, where the invite message carries the terminal identifier, so that the recording server management device determines the working recording server according to the terminal identifier, and sends the terminal identifier to the working recording server, where further, the receiving apparatus 1903 receives an invite response that includes the IP address and the port number that are of the working recording server and that is returned by the recording server management device; and controlling the sending apparatus 1904 to send the second recording indication to the working recording server using the recording server management device.

In some implementation manners, the processor 1901 may further perform the following step: when it is determined that a medium used by all the terminals that are in the same call to have the call is an encrypted medium, controlling, by the processor 1901, all the terminals that are in the same call to change the medium used in the call into an unencrypted medium by means of negotiation, where before the sending, to the working recording server using the IP address and the port number, the media stream that is generated when the multiple terminals that are in the same call have the call, the following is further included: controlling the multiple terminals that are in the same call to change the medium used in the call into an encrypted medium by means of renegotiation; and separately decrypting received media streams that are sent by the multiple terminals that are in the same call, to obtain decrypted media streams, performing audio mixing on the decrypted media streams, and sending the decrypted media streams on which audio mixing is performed to the working recording server using the IP address and the port number.

In some implementation manners, the processor 1901 may further perform the following step: connecting, according to the IP address and the port number that are of the working recording server, the working recording server to a voice site that includes the multiple terminals that are in the same call.

In some implementation manners, the processor 1901 may further perform the following step: after the receiving apparatus 1903 receives the recording instruction, creating, according to the terminal identifier, the voice site that includes the terminals that are in the same call.

Figure 20:
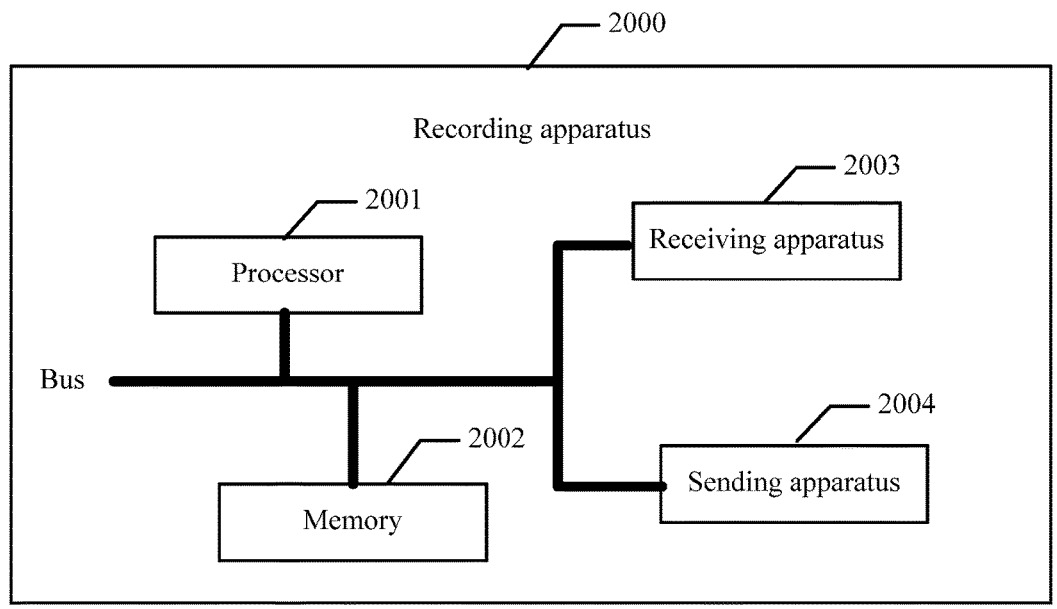
FIG. 20 is a schematic diagram of a physical apparatus of a recording server management device according to this embodiment.

Referring to FIG. 20, FIG. 20 is another schematic structural diagram of a recording apparatus according to an embodiment of the present disclosure. The recording apparatus 2000 may include at least one processor 2001 (for example, a CPU), at least one network interface or another communications interface, a memory 2002, at least one communications bus, at least one receiving apparatus 2003, and at least one sending apparatus 2004, so as to implement connection and communication between these apparatuses. The processor 2001 is configured to execute an executable module, such as a computer program, stored in the memory 2002. The memory 2002 may include a high-speed RAM, or may further include a non-volatile memory (non-volatile memory), for example, at least one magnetic disk memory. A communication connection between a system gateway and at least one other network element is implemented using at least one network interface (which may be wired or wireless), and the Internet, a wide area network, a local network, a metropolitan area network, and the like may be used.

As shown in FIG. 20, in some implementation manners, the memory 2002 stores a program instruction, the program instruction may be executed by the processor 2001, and the processor 2001 performs the following steps: receiving, by the receiving apparatus 2003, a first recording indication that is sent by the sending apparatus 2004 when an IP PBX receives a recording instruction sent by any terminal of multiple terminals that are in a same call, where the first recording indication includes a terminal identifier of the any terminal of the multiple terminals; selecting, by the processor 2001, from at least one recording server according to the first recording indication, a recording server connected to a mirrored port of a mirror switch as a working recording server for recording, so that the working recording server acquires, according to the terminal identifier carried in the first recording indication, a media stream that is generated when the multiple terminals that are in the same call have the call, and stores, corresponding to the terminal identifier, the media stream that is generated when the multiple terminals that are in the same call have the call in the memory 2002; and forwarding the first recording indication to the working recording server; receiving, by the receiving apparatus 2003, an invite message sent by an IP PBX, where the invite message includes the terminal identifier, and controlling, by the processor 2001 according to the invite message, the working recording server to connect to a voice site that includes the multiple terminals that are in the same call; determining, by the processor 2001, the working recording server according to the terminal identifier, and forwarding the terminal identifier to the working recording server; controlling, by the processor 2001, the sending apparatus 2004 to return, to the IP PBX, an invite response that includes an IP address and a port number that are of the working recording server, so that the IP PBX sends, to the working recording server using the IP address and the port number, the media stream that is generated when the multiple terminals that are in the same call have the call; and when the receiving apparatus 2003 receives a second recording indication sent by the IP PBX, and determines that the working recording server is successfully connected to the voice site, forwarding, by the sending apparatus 2004, the second recording indication to the working recording server, and instructing, by the processor 2001, the working recording server to stop acquiring, from the mirror switch, the media stream that is generated when the multiple terminals that are in the same call have the call, start to receive a media stream that is generated when the multiple terminals that are in the same call have the call and that is sent by the IP PBX, and store, corresponding to the terminal identifier, the media stream that is generated when the multiple terminals that are in the same call have the call in the memory 2002.

Figure 21:
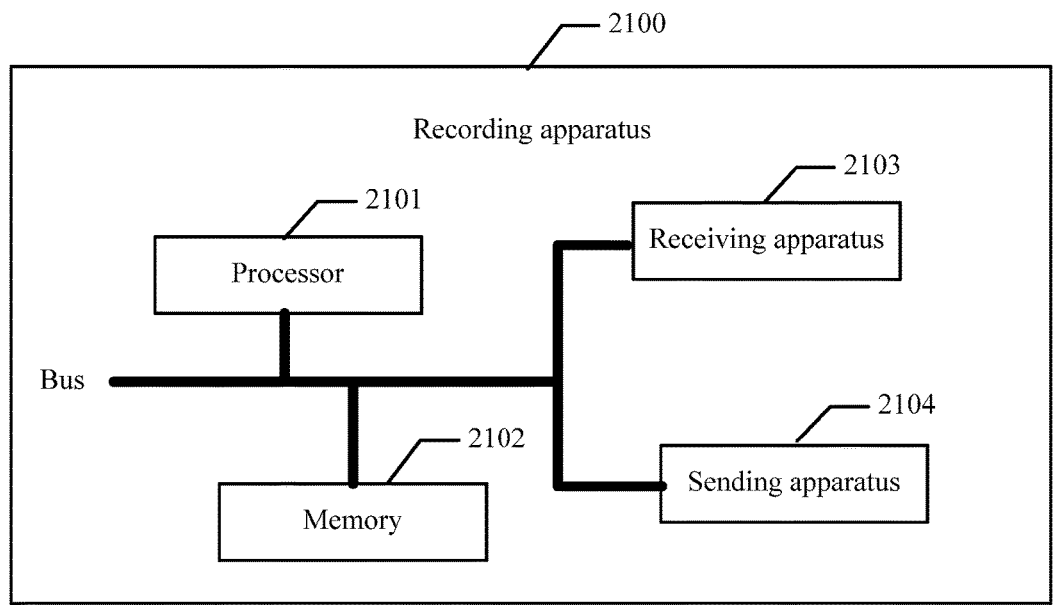
FIG. 21 is a schematic diagram of a physical apparatus of a recording server according to this embodiment.

Referring to FIG. 21, FIG. 21 is another schematic structural diagram of a recording apparatus according to an embodiment of the present disclosure. The recording apparatus 2100 may include at least one processor 2101 (for example, a CPU), at least one network interface or another communications interface, a memory 2102, at least one communications bus, at least one receiving apparatus 2103, and at least one sending apparatus 2104, so as to implement connection and communication between these apparatuses. The processor 2101 is configured to execute an executable module, such as a computer program, stored in the memory 2102. The memory 2102 may include a high-speed RAM, or may further include a non-volatile memory (non-volatile memory), for example, at least one magnetic disk memory. A communication connection between a system gateway and at least one other network element is implemented using at least one network interface (which may be wired or wireless), and the Internet, a wide area network, a local network, a metropolitan area network, and the like may be used.

As shown in FIG. 21, in some implementation manners, the memory 2102 stores a program instruction, the program instruction may be executed by the processor 2101, and the processor 2101 performs the following steps: receiving, by the receiving apparatus 2103, a first recording indication sent by an IP PBX, acquiring, from a mirror switch connected to the IP PBX, according to a terminal identifier that is of any terminal of multiple terminals that are in a same call and that is carried in the first recording indication, a media stream that is generated when the multiple terminals that are in the same call have the call, and storing, corresponding to the terminal identifier, the media stream that is generated when the multiple terminals that are in the same call have the call in the memory 2102, where the receiving apparatus 2103 receives the media stream that is generated when the multiple terminals that are in the same call have the call and that is sent by the IP PBX after the IP PBX acquires an IP address and a number of a port for transmitting the media stream that are of a recording server, where the IP PBX sends the media stream using the IP address and the port number; and when the receiving apparatus 2103 receives the terminal identifier and a second recording indication that are sent by the IP PBX, according to the second recording indication, stopping acquiring, from the mirror switch, the media stream that is generated when the multiple terminals that are in the same call have the call, and starting to store, corresponding to the terminal identifier, the media stream that is generated when the multiple terminals that are in the same call have the call and that is received from the IP PBX in the memory 2102.

In some implementation manners, the processor 2101 may further perform the following step: performing, using a mirrored port, which is connected to the IP PBX, of the mirror switch, mirrored packet capture on a data packet corresponding to an IP address of the terminal and a port number, to acquire the media stream that is generated when the multiple terminals that are in the same call have the call, and storing the media stream in the memory 2102, where the terminal identifier includes the IP address of the terminal.

In the foregoing embodiments, the description of each embodiment has respective focuses. For a part that is not described in detail in an embodiment, reference may be made to related descriptions in other embodiments.

It may be clearly understood by a person skilled in the art that, for the purpose of convenient and brief description, for a detailed working process of the foregoing system, apparatus, and unit, reference may be made to a corresponding process in the foregoing method embodiments, and no further details are described herein.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of the present disclosure. The foregoing storage medium includes any medium that can store program code, such as a universal serial bus (USB) flash drive, a removable hard disk, a read-only memory (ROM), a RAM, a magnetic disk, or an optical disc.

The recording method, apparatus, and system that are provided in the present disclosure are described in detail above. The principle and implementation manners of the present disclosure are elaborated herein using specific examples. The descriptions about the embodiments are used only to help understand the method and core ideas of the present disclosure. In addition, a person of ordinary skill in the art can make modifications to the specific implementation manners and application scopes according to the ideas of the present disclosure. Therefore, the content of this specification shall not be construed as a limit to the present disclosure.

What is claimed is:

1. A recording method applied to a voice call system, the voice call system comprising an internet protocol private branch exchange (IP PBX), a mirror switch, and at least one recording server, the IP PBX being coupled to the mirror switch, and the method comprising:
   sending, by the IP PBX, a first recording indication to a working recording server of the at least one recording server when the IP PBX receives a recording instruction sent by any terminal of multiple terminals that are in a same call, the working recording server being coupled to a mirrored port of the mirror switch, the first recording indication comprising a terminal identifier of the any terminal of the multiple terminals, and the first recording indication instructing the working recording server to acquire, from the mirror switch according to the terminal identifier using the mirrored port, a media stream generated when the multiple terminals have the call, and store, corresponding to the terminal identifier, the media stream generated when the multiple terminals have the call;

acquiring, by the IP PBX, an IP address and a port number of a port of the working recording server for transmitting the media stream;

sending, by the IP PBX to the working recording server using the IP address and the port number of the port of the working recording server, the media stream generated when the multiple terminals that are in the same call have the call; and sending the terminal identifier and a second recording indication to the working recording server in order to instruct the working recording server to stop acquiring, from the mirror switch, the media stream generated when the multiple terminals that are in the same call have the call, and start storing, corresponding to the terminal identifier, the media stream generated when the multiple terminals have the call and received from the IP PBX.

2. The method according to claim 1, wherein the terminal identifier comprises an IP address of the any terminal, and sending, by the IP PBX, the first recording indication to the working recording server comprising sending, by the IP PBX, the first recording indication to the working recording server, so that the working recording server performs, using the mirrored port coupled to the working recording server, mirrored packet capture on a data packet corresponding to the IP address of the any terminal in order to acquire the media stream generated when the multiple terminals that are in the same call have the call, and stores, corresponding to the IP address of the any terminal, the media stream generated when the multiple terminals that are in the same call have the call.

3. The method according to claim 1, wherein the voice call system comprises multiple recording servers and a recording server management device, and sending, by the IP PBX, the first recording indication to the working recording server comprising sending, by the IP PBX, the first recording indication to the recording server management device, so that the recording server management device selects, from at least two recording servers according to the first recording indication, the working recording server coupled to the mirrored port of the mirror switch, and forwards the first recording indication to the working recording server, acquiring, by the IP PBX, the IP address and the port number of the port of the working recording server, and sending the terminal identifier to the working recording server comprising:

sending, by the IP PBX, an invite message to the recording server management device; and receiving an invite response that comprises the IP address and the port number that are of the working recording server and returned by the recording server management device, sending the terminal identifier to the working recording server comprising:

adding the terminal identifier to the invite message; and sending the invite message to the recording server management device, so that the recording server management device determines the working recording server according to the terminal identifier, and sends the terminal identifier to the working recording server, and sending the second recording indication to the working recording server comprising sending the second recording indication to the working recording server using the recording server management device.

4. The method according to claim 1, wherein after the IP PBX receives the recording instruction sent by the any terminal, the method further comprises controlling, by the IP PBX when the IP PBX determines that a medium used by each terminal in the same call is an encrypted medium, each terminal in the same call to change the medium used in the call into an unencrypted medium by means of negotiation, before sending, by the IP PBX to the working recording server using the IP address and the port number, the media stream generated when the multiple terminals that are in the same call have the call, the method further comprising controlling, by the IP PBX, the multiple terminals that are in the same call to change the medium used in the call into an encrypted medium by means of renegotiation, and sending, to the working recording server using the IP address and the port number, the media stream generated when the multiple terminals that are in the same call have the call comprising:

separately decrypting received media streams from the multiple terminals that are in the same call in order to obtain decrypted media streams, performing audio mixing on the decrypted media streams; and sending the decrypted media streams on which audio mixing is performed to the working recording server using the IP address and the port number.

5. The method according to claim 1, wherein after acquiring, by the IP PBX, the IP address and the port number of the port of the working recording server, the method further comprises connecting, by the IP PBX according to the IP address of the working recording server, the working recording server to a voice site that comprises the multiple terminals that are in the same call.

6. The method according to claim 5, wherein when there are two terminals in the same call, the method further comprises creating, by the IP PBX according to the terminal identifier after the IP PBX receives the recording instruction, a voice site that comprises the two terminals that are in the same call.

7. An internet protocol private branch exchange (IP PBX), comprising:

a memory storing executable instructions; and a processor coupled to the memory and configured to:

send, when a recording instruction sent by any terminal of multiple terminals that are in a same call is received, a first recording indication to a working recording server of at least one recording server, the working recording server being coupled to a mirrored port of a mirror switch, the first recording indication comprising a terminal identifier of the any terminal of the multiple terminals, and the first recording indication instructing the working recording server to acquire, from the mirror switch according to the terminal identifier using the mirrored port, a media stream generated when the multiple terminals that are in the same call have the call, and store, corresponding to the terminal identifier, the media stream generated when the multiple terminals that are in the same call have the call;

acquire an IP address and a port number of a port of the working recording server for transmitting the media stream;

send the terminal identifier to the working recording server;

send, to the working recording server using the IP address and the port number, the media stream generated when the multiple terminals that are in the same call have the call;

send a second recording indication to the working recording server to instruct the working recording server to stop acquiring, from the mirror switch, the media stream generated when the multiple terminals that are in the same call have the call; and send, to the working recording server, the media stream generated when the multiple terminals that are in the same call have the call, so that the working recording server stores, corresponding to the terminal identifier, the media stream generated when the multiple terminals that are in the same call have the call.

8. The IP PBX according to claim 7, wherein the terminal identifier comprises an IP address of the any terminal, and the processor being further configured to send the first recording indication to the working recording server, so that the working recording server performs, using the mirrored port coupled to the working recording server, mirrored packet capture on a data packet corresponding to the IP address of the any terminal in order to acquire the media stream generated when the multiple terminals that are in the same call have the call.

9. The IP PBX according to claim 7, wherein the processor is further configured to:

send the first recording indication to a recording server management device, so that the recording server management device selects, from at least two recording servers according to the first recording indication, the working recording server coupled to the mirrored port of the mirror switch, and forwards the first recording indication to the working recording server;

add the terminal identifier to an invite message;

send the invite message to the recording server management device, so that the recording server management device determines the working recording server according to the terminal identifier, and sends the terminal identifier to the working recording server;

acquire an invite response that comprises the IP address and the port number of the port of the working recording server and returned by the recording server management device;

acquire the IP address and the port number of the port of the working recording server from the invite response; and send the second recording indication to the working recording server using the recording server management device.

10. The IP PBX according to claim 9, wherein the processor is further configured to:

control the multiple terminals in the same call to change a medium used in the call into an unencrypted medium by means of negotiation when it is determined that the medium used by the multiple terminals in the same call to have the call is an encrypted medium;

control the multiple terminals in the same call to change the medium used in the call into an encrypted medium by means of renegotiation; and separately decrypt received media streams that are sent by the multiple terminals that are in the same call in order to obtain decrypted media streams;

perform audio mixing on the decrypted media streams; and send the decrypted media streams on which audio mixing is performed to the working recording server using the IP address and the port number.

11. The IP PBX according to claim 10, wherein the processor is further configured to connect, according to the IP address of the working recording server, the working recording server to a voice site that comprises the multiple terminals that are in the same call.

12. The IP PBX according to claim 11, wherein the processor is further configured to create, according to the terminal identifier, the voice site that comprises the multiple terminals that are in the same call after the recording instruction is received.

13. A recording system, comprising:

an internet protocol private branch exchange (IP PBX), comprising:

a memory storing executable instructions; and a processor coupled to the memory and configured to:

send a first recording indication to a working recording server of at least one recording server when a recording instruction sent by any terminal of multiple terminals that are in a same call is received, the working recording server being coupled to a mirrored port of a mirror switch, the first recording indication comprising a terminal identifier of the any terminal of the multiple terminals, and the first recording indication instructing the working recording server to acquire, from the mirror switch according to the terminal identifier using the mirrored port, a media stream generated when the multiple terminals that are in the same call have the call, and store, corresponding to the terminal identifier, the media stream generated when the multiple terminals that are in the same call have the call;

acquire an IP address and a port number of a port of the working recording server for transmitting the media stream;

send the terminal identifier to the working recording server;

send, to the working recording server using the IP address and the port number, the media stream generated when the multiple terminals that are in the same call have the call;

send a second recording indication to the working recording server in order to instruct the working recording server to stop acquiring, from the mirror switch, the media stream generated when the multiple terminals that are in the same call have the call; and send, to the working recording server, the media stream generated when the multiple terminals that are in the same call have the call, so that the working recording server stores, corresponding to the terminal identifier, the media stream generated when the multiple terminals that are in the same call have the call; and the working recording server, comprising:

a receiver configured to receive the first recording indication sent by the IP PBX;

a server processor configured to:
  acquire, from the mirror switch coupled to the IP PBX, according to a terminal identifier of any terminal of multiple terminals that are in a same call and carried in the first recording indication, a media stream generated when the multiple terminals that are in the same call have the call; and
  store, corresponding to the terminal identifier, the media stream generated when the multiple terminals that are in the same call have the call, the receiver being further configured to:
  receive the media stream generated when the multiple terminals that are in the same call have the call and sent by the IP PBX after the IP PBX acquires the IP address and the port number of the port for transmitting the media stream that are of the working recording server, the IP PBX sending media stream using the IP address and the port number;
  receive the terminal identifier and the second recording indication that are sent by the IP PBX, the second recording indication instructing the server processor to stop acquiring, according to the terminal identifier, the media stream generated when the multiple terminals have the call, and the server processor being further configured to:
  stop acquiring, from the mirror switch, the media stream generated when the multiple terminals that are in the same call have the call according to the second recording indication received by the receiver; and
  start storing, corresponding to the terminal identifier, a media stream generated when the multiple terminals that are in the same call have the call and received from the IP PBX.

\* \* \* \* \*